United States Patent
Chien et al.

[11] Patent Number: 5,668,614
[45] Date of Patent: Sep. 16, 1997

[54] PIXELIZED LIQUID CRYSTAL DISPLAY MATERIALS INCLUDING CHIRAL MATERIAL ADOPTED TO CHANGE ITS CHIRALITY UPON PHOTO-IRRADIATION

[75] Inventors: Liang-Chy Chien, Stow; Joseph William Doane, Kent, both of Ohio

[73] Assignee: Kent State University, Kent, Ohio

[21] Appl. No.: 431,540

[22] Filed: May 1, 1995

[51] Int. Cl.$^6$ ............. G02F 1/1335; G02F 1/13
[52] U.S. Cl. .............. 349/115; 349/176; 252/299.7
[58] Field of Search ............ 359/91, 105; 252/299.7; 349/115, 176

[56] References Cited

U.S. PATENT DOCUMENTS

| | | | |
|---|---|---|---|
| 3,585,381 | 6/1971 | Hodson et al. | 250/47 |
| 3,600,060 | 8/1971 | Churchill et al. | 350/160 |
| 3,620,889 | 11/1971 | Baltzer | 161/5 |
| 3,650,603 | 3/1972 | Heilmeier et al. | 350/160 |
| 3,656,909 | 4/1972 | Dixon et al. | 252/408 |
| 3,663,390 | 5/1972 | Fergason et al. | 350/160 |
| 3,680,950 | 8/1972 | Haas et al. | 350/150 |
| 3,703,331 | 11/1972 | Goldmacher et al. | 350/160 |
| 3,711,713 | 1/1973 | Wysocki et al. | 350/160 |
| 3,795,529 | 3/1974 | Cartmell et al. | 350/160 |
| 3,806,230 | 4/1974 | Haas | 252/408 |
| 3,816,786 | 6/1974 | Churchill et al. | 313/91 |
| 3,821,720 | 6/1974 | Greuber et al. | 340/173 |
| 3,871,904 | 3/1975 | Haas et al. | 117/72 |
| 3,885,982 | 5/1975 | Fergason et al. | 106/252 |
| 3,891,307 | 6/1975 | Tsukamoto et al. | 350/160 |
| 3,947,183 | 3/1976 | Haas | 350/160 |
| 3,969,264 | 7/1976 | Davis | 252/299 |
| 4,022,706 | 5/1977 | Davis | 252/299 |
| 4,070,912 | 1/1978 | McNaughton | 73/256 |
| 4,077,260 | 3/1978 | Gray et al. | 73/356 |
| 4,097,127 | 6/1978 | Haas et al. | 350/332 |
| 4,161,557 | 7/1979 | Suzuki et al. | 428/1 |
| 4,252,417 | 2/1981 | Scheffer et al. | 350/349 |
| 4,408,201 | 10/1983 | Harada | 340/784 |
| 4,447,132 | 5/1984 | de Zwart | 350/346 |
| 4,671,618 | 6/1987 | Wu et al. | 350/347 |
| 4,673,255 | 6/1987 | West et al. | 350/347 |
| 4,685,771 | 8/1987 | West et al. | 350/320 |
| 4,688,900 | 8/1987 | Doane et al. | 350/347 |

(List continued on next page.)

FOREIGN PATENT DOCUMENTS

| | | |
|---|---|---|
| 0313053 | 4/1989 | European Pat. Off. |
| 0451905 | 3/1991 | European Pat. Off. |
| 0423881 | 4/1991 | European Pat. Off. |
| 6320674 | 8/1985 | Japan . |
| 3-164718 | 7/1991 | Japan . |
| 1161039 | 8/1969 | United Kingdom . |
| 86/01927 | 3/1987 | WIPO . |

OTHER PUBLICATIONS

Heilmeier et al, A New Electric Field Controlled Reflective Optical Storage Effect in Mixed Liquid Crystal Systems, Proc IEEE vol. 51 No. 1 pp. 34–38 (1969).

(List continued on next page.)

*Primary Examiner*—William L. Sikes
*Assistant Examiner*—Charles Miller
*Attorney, Agent, or Firm*—Renner, Kenner, Greive, Bobak, Taylor & Weber

[57] ABSTRACT

An improvement in a light modulating chiral nematic liquid crystal adapted to form focal conic and twisted planar textures and a liquid crystal device employing such a material, the improvement wherein the liquid crystal material includes a plurality of essentially distinct regions within which the liquid crystal has different pitch lengths, whereby the liquid crystal can be made to reflect different wavelengths of light in different regions. The regions are created by including in the chiral nematic liquid crystal composition, a chiral material adapted to change its chirality upon photo-irradiation, in an amount effective to change the pitch length of the liquid crystal composition upon photo-irradiation. By exposing different regions of the material to increasing amounts of photo-irradiation, the pitch length of each region can be selectively tuned to reflect light of a different wavelength.

30 Claims, 4 Drawing Sheets

U.S. PATENT DOCUMENTS

| | | | |
|---|---|---|---|
| 4,890,902 | 1/1990 | Doane et al. | 350/347 |
| 4,994,204 | 2/1991 | Doane et al. | 350/347 |
| 5,082,351 | 1/1992 | Fergason | 359/51 |
| 5,087,387 | 2/1992 | Mullen et al. | 359/103 |
| 5,116,528 | 5/1992 | Mullen et al. | 252/299.5 |
| 5,138,472 | 8/1992 | Jones et al. | 359/52 |
| 5,170,271 | 12/1992 | Lackner et al. | 359/51 |
| 5,172,256 | 12/1992 | Sethofer et al. | 359/77 |
| 5,251,048 | 10/1993 | Doane et al. | 359/51 |
| 5,384,067 | 1/1995 | Doane et al. | 359/91 |
| 5,453,863 | 9/1995 | West et al. | 359/102 |
| 5,506,704 | 4/1996 | Broer et al. | 359/63 |

OTHER PUBLICATIONS

Dir et al. Cholesteric Liquid Crystal Texture Change Displays, Proc SID, vol. 13 pp. 105–113 (1972).

Hulin, Pharametric Study of the Optical Storage Effect in Mixed Liquid Crystal Systems, Appl. Phys. Lett. vol. 21 pp. 455–457 (Nov. 15, 1972).

Greubel et al., Electric Field Induced Texture Changes in Certain Nematic/Cholesteric Liquid Crystal Mixtures; Mol. Crys. Liq. Crys. vol. 24 pp. 1030–1011.

White et al. New Absorptive Mode Reflective Liquid–Crystal Display Device J. Appl. Phys vol. 45, pp. 4718–4723–Nov. 1974.

Gray, Dyestuffs and Liquid Crystals, Chimia vol. 34, p. 47 Feb. 1980.

Wysocki et al. Electric Field Induced Phase Change in Cholesteric Liquid Crystals, Physical Review Letters vol. 20 No. 19 pp. 1024–1025 (1968).

Muller, Effects of Electric Fields on Cholesterol Nonanoate Liquid Crystals, Molecular Crystals vol. 2 pp. 167–188 (1966).

Harper, Voltage Effects In Cholesteric Liquid Crystals, Molecular Crystals, vol. 1, pp. 325–332 (1966).

West, Phase Separation of Liquid Crystals in Polymers, Mol. Cryst. Liq Cryst. vol. 157 pp. 427–441 (Apr. 1988).

Mochizuki et al. A 1120×768 Pixel Four–Color Double–Layer Liquid Crystal Projection Display, Proc SID vol. 31 No. 2 p. 15 (1990).

Wysocki, Electric Field Induced Phase Change in Cholesteric Liquid Crystals, Research Laboratories, Xerox Corp pp. 47–65—date unknown.

Gerber, Voltage Induced Cholesteric Structure Transformation in Thin Layers, Z. Naturforsch. pp. 718–726 (1981).

Hikmet, Structure of Cholesteric Gels & Their Electrically Induced Light Scattering & Color Changes, Liquid Crystals vol. 12 No. 2 pp. 319–336 (1992).

Hikmet, Electrically Induced Light Scattering From Anisotropic Gels J. Appl. Appl. Phys. vol. 68 No. 9 pp. 4406–4412 (Nov. 1, 1990).

Hikmet, Anisotropic Gels & Plasticized Networks Formed by Liquid Crystal Molecules, Liquid Crystals, vol. 98, pp. 405–416 (1991).

Wu et al. Zero Field, Multistable Cholesteric Liquid Crystal Displays Submitted for presentation at Workshop on Display Material date unknown.

Yang et al. Cholesteric Liquid Crystal/Polymer Gel Dispersion Bistable at Zero Field—1991 IEEE pp. 49–52 (Aug. 1991).

Yang et al. Cholesteric Liquid Crystal/Polymer Dispersion For Haze Free Shutters—Appl. Phys. Lett 60, pp. 3101–3104 (1992).

Doane—Front–Lit Panel Display Form Polymer Stabilized Cholesteric Textures, Oct. 1992.

Yang et al., Cholesteric Liquid Crystal/Polymer Gel Dispersion Reflective Display Application, May 1992.

Doane et al. Current Trends in Polymer Dispersed Liquid Crystals, 1991 IEEE pp. 175–178 (Aug. 1991).

Jiang et al., Electro–Optics of Multi–Cholesteric Focal Conic Texture with Polymer, Chem Express vol. 6, pp. 1005–1003 (1991).

Aliev, Three State of a Cholesteric Liquid Crystal In Micropores CA Selects–Liquid Crystals 12 pp. 1–7 (1985).

Candau et al. Magnetic Field Effects in Nematic & Cholesteric Droplets Suspended In An Isotropic Liquid—Mol. Cryst. vol. 23 pp. 283–287 (73).

Terao, et al. Fabrication of Fine Barrier ribs for Color Plasma Display Panels by Sandblasting, SID 92 Digest, pp. 724–727.

Hochgesand et al, New Chiral Dopants with High Helical Twisting Power in Nematic Liquid Crystals, pp. 3–22 (Jul. 1989).

L. T. Thompson, Introduction to Microlithography, ACS Symposium Series 219, pp. 3–11 (Mar. 1983).

Binkley et al., Photoremovable Protecting Groups pp. 375–423.

Turro, Photofragmentation Reactions, Modern Molecular Photochemistry, pp. 532–571.

Lewis et al, Cage Effects in the Photochemistry of (S)–(+)–2–Phenylpropiophenone, Journal of American Chemical, pp. 5973–5976 (Sep. 1973).

Coyle, Photochemistry of Organic Carbonly Compounds, Introduction of Organic Photochemistry, pp. 106–125 (1986).

Reetz, Enantioselective Addition of Chirally Modified Methyltitanium Reagents . . . Tetrahedron Letters vol. 27—No. 47—pp. 5111–5114.

Sur et al. ESR Characterizations and Photochemistry of the Free Radical Species . . . Spectroscopy Letters 22(8) pp. 965–971 (1989).

Haas et al. Interaction Between UV Radiation & Cholesteric Liquid Crystals, Molecular Crystals & Liquid Crystals vol. 7, pp. 371–379 (1969).

Yarmolenko et al., Photosensitive Chiral Dopants with High Twisting Power, Liquid Crystals, vol. 16 No. 5 pp. 877–882 (1994).

Maurer et al. Cholesteric Reflectors with a Color Pattern, SID 94 Digest, pp. 399–402.

Haberle et al, Right & Left Circular Polarizing Colorfilters Made from Crosslinkable Cholesteric LC–Silicones–pp. 57–59 (1991).

Cram et al, Electrophilic Substitutions at Saturated Carbon Stereochemical Capabilites . . . vol. 83, (May 20, 1961).

Cameron et al, Photogeneration of Organic Bases from o–Nitrobenzyl derived Carbamates , J. Am. Chem. pp. 4303–4313 (1991).

Heppke et al., Blue Phase Mixtures Exhibiting Low Fractions of a Chiral Compound . . . Liquid Crystals, vol. 8, pp. 407–418 (1990).

Heppke et al, Angular Dependence of Blue Phase Selective Feflection in the Electric Field, Mol. Cryst. Liq. Cryst. vol. 150b pp. 265–276 (87).

Heppke et al. Electrostriction of the Colesteric Blue Phases BPI & BPII in Mixtures with Positive . . . J. Phys. pp. 2991–2998 (1989).

Davidson et al, Mechanism of the Photoinduce Decarboxylation of Carboxylic Acids . . . pp. 1357–1362 (1972).

PIXELIZED LIQUID CRYSTAL DISPLAY MATERIALS INCLUDING CHIRAL MATERIAL ADOPTED TO CHANGE ITS CHIRALITY UPON PHOTO-IRRADIATION

This application was made in part with government support under cooperative agreement number DMR 89-20147 awarded by the National Science Foundation. The government has certain rights in this invention.

BACKGROUND OF THE INVENTION

Full color-flat panel displays are essential for the development of many new devices such as notebook displays, signs, hand-held video displays and flat panel television. It has not yet been possible to make a multiple color liquid crystal display without the use of passive color filters or creating separate sealed compartments, each compartment containing a liquid crystal material that transmits or reflects a different color. This is typically done by stacking separate display cells, each containing cholesteric liquid crystal having a pitch length effective to reflect a different primary color. The necessity of preparing three separate display cells and providing them with suitable drive electronics complicates the manufacture and increases the cost of commercial devices. Moreover, the stacking of cells gives rise to an angular parallax between the individual colored cells which limits the useful viewing angle.

It has also not been possible to make a black and white reflective material suitable for devices requiring high quality black and white reflective displays. A white on black or black on white reflective display currently does not exist on the market to the knowledge of the inventors. Many new devices such as cellular telephones, electronic books and the like require reflective black and white displays for commercial viability.

The invention overcomes the drawbacks of known color displays and, for the first time, provides a good black and white reflective material. In particular, the invention provides a method of pixelizing a chiral nematic liquid crystal material whereby each pixel can be made to reflect a different color. By pixelizing the liquid crystal material itself, a single display cell can be divided into a matrix of different colors that can be separately modulated to create a high-resolution image in full color, or modulated in combinations that appear white. This innovation provides a low-cost means of making high-resolution multicolor displays and active (i.e. switchable) color filters, which obviates the problems associated with known technologies and for the first time enables the production of a black and white reflective flat-panel display.

DESCRIPTION OF THE INVENTION

The invention involves the use of a novel class of additives for a liquid crystal material in conjunction with photolithography or other masking techniques. As is known in the art, chiral nematic (i.e., cholesteric) liquid crystals can be made to exhibit different optical states under different electrical field conditions and are characterized by a unique combination of properties, including optical bistability, making them particularly useful in display applications. Depending upon the magnitude and shape of the electric field pulse, the optical state of the material can be changed between light scattering and light reflecting states, or any one of a number of intermediate states therebetween which can be made to reflect any desired intensity of colored light along a continuum of such states, thus providing grey scale.

With such chiral nematic materials, a low electric field pulse generally results in a light scattering focal conic texture. The application of a sufficiently high electric field pulse, i.e., an electric field high enough to homeotropically align the liquid crystal directors, will, upon removal of the pulse, drive the material to a light reflecting twisted planar texture that can be any desired color depending upon the pitch length of the liquid crystal. The light scattering and light reflecting states can be made to remain stable at zero field. If a sufficiently high electric field is maintained, the material is transparent until the field is removed. When the field is turned off quickly, the material reforms to the light reflecting state and, when the field is turned off slowly, the material reforms to the light scattering state. Electric field pulses of various magnitudes below that necessary to drive the material from the stable reflecting state to the stable scattering state will drive the material to intermediate states that are themselves typically stable. These multiple stable states indefinitely reflect colored light of an intensity between that reflected by the reflecting and scattering states. Thus, depending upon the magnitude of the electric field pulse the material exhibits stable grey scale reflectivity. Application of mechanical stress to the material can also be used to drive the material from the light scattering to the light reflecting state.

The color reflected by a chiral nematic liquid crystal depends upon the pitch length of the liquid crystal, which is in turn dependent upon the amount of chiral material in the liquid crystal. The method and materials of the invention enable one to selectively adjust the pitch length of a liquid crystal material and hence, the color reflected thereby. The unique additives according to the invention have tunable chirality. By irradiating a tunable chiral material (TCM) with, for example, UV light or other high energy source such as laser, they can be changed from chiral to achiral or to a racemic mixture. When one or more TCM's are included in a chiral-nematic liquid crystal material, the pitch length of the resulting liquid crystal mixture can be either extended or shortened by varying exposures to UV light. By irradiating different regions of the material with different amounts of UV through the use of masking techniques, the pitch lengths of each region can be tuned to reflect a different color, thereby creating different colored pixels in the liquid crystal material itself. When employed in a cell having suitable drive electronics, the pixels can be switched between light scattering and color reflecting states individually or in groups to provide full color images. The material may also be used as an active color filter whereby the color reflective mode may be selectively actuated.

The effect that the TCM will have on the liquid crystal material to which it is added depends upon the handedness of the chirality of the TCM i.e., whether the TCM is dextrorotatory or levorotatory, the handedness, if any, of the liquid crystal material, and the twisting power of each. In general, if one adds a TCM of the same chirality as the liquid crystal, the pitch length of the liquid crystal material is initially shortened due to the increase in the amount of chiral material having the same chirality. By contrast, if one adds a TCM having the opposite chirality as the liquid crystal, the pitch length is extended due to the counteracting effect of the increased amount of chiral material having the opposite chirality.

More particularly, if one begins with a chiral nematic or cholesteric liquid crystal having a right-handed twist, i.e., that is dextrorotatory, and adds a TCM that is also right-handed, the pitch length of the mixture will initially be shortened due to the increase in the concentration of right handed material in the composition. By irradiating the material with ultraviolet, the chirality of the TCM is either destroyed by the photo-elimination of its chiral centers, or the amount of right handed material is reduced by racemization or isomerization of the TCM additive. In either case, the amount of right handed material in the irradiated regions is reduced, thereby extending the pitch length of the irradiated regions and altering the color reflected thereby. The same holds true if one begins with a left-handed or levorotatory chiral nematic liquid crystal, and adds a left-handed TCM. The pitch length will again initially be shortened and, upon irradiation, will be extended by the photo-elimination of chiral centers or racemization in the irradiated regions.

In practical application, the initial shortening of the pitch length upon addition of a dextrorotatory TCM to a dextrorotatory cholesteric, or a levorotatory TCM to a levorotatory cholesteric, will typically be adjusted so that the pitch of the resulting mixture initially reflects a good primary blue color, since the addition shifts the material toward the blue reflecting region anyway. This adjustment can be readily done by adjusting the various concentrations of TCM and/or chiral additive, if any, in the liquid crystal mixture. The different colored pixels may then be generated by irradiating the mixture with increasing doses of UV. After the initial addition of TCM, those regions or pixels that are desired to remain blue are masked. The remainder of the material is then further irradiated until the pitch of the material is extended to reflect the next desired color, such as green light. Those regions which are desired to remain green are then also masked and the material again irradiated until the pitch is extended further to reflect red. In this way, three colored pixels may be formed in the order of blue-green-red. Of course, what constitutes a good or desirable set of colors along the visible spectrum is a matter of some subjective judgment and may depend upon the application to which the material is to be put. Accordingly, it is to be understood that the pixels can be adjusted to any desired color, for example in the order of blue-yellow-red, light blue-yellow-orange etc., depending upon the desired effect.

By contrast, when one starts with a chiral nematic liquid crystal that is left-handed or levorotatory, and adds a right-handed TCM, or starts with a right-handed chiral nematic and adds a left-handed TCM, the pitch length of the resulting mixture is initially extended. Subsequent U.V. irradiation then shortens the pitch length due to racemization or the photo-elimination of chiral centers and effective decrease in the concentration of oppositely twisted TCM in the irradiated regions. Since, in practical application, the addition of a TCM of the opposite chirality as the cholesteric typically extends the pitch of the resulting mixture toward the red reflecting region, the concentrations are adjusted so that the three primary colored pixels in these mixtures may be produced in the order of red-green-blue upon increasing exposure to ultraviolet. As in the case where the liquid crystal and TCM are of the same handedness, variations in the colors produced, e.g., red-yellow-blue rather than red-green-blue, may be desirable depending upon the intended use and subjective judgment.

Pixelization of the liquid crystal material may be performed by using photolithography to create a high resolution mask. Alternatively, an electrically addressable chiral nematic light shutter or similar liquid crystal device can be used to perform the masking function. In this way the mask shape can be conveniently controlled electronically. For color display applications the mask should ideally correspond to the resolution and pattern of the lines and rows of the drive electrodes so that the pixels can be switched individually.

In some cases, the pixels may tend to bleed or diffuse in the cell. If necessary to prevent diffusion, a small amount of polymer network forming material can be added to the mixture and/or the TCM's can be synthesized to include polymerizable functional groups. In this way, the different colored regions or pixels can be locked in place by polymerizing the material to form a polymerized network of polymer, or polymer and TCM. The network is preferably formed by photopolymerizable materials and may be conducted either before, during or after pixelization. In some instances it may be advantageous to induce the polymerization of the network prior to the pixelization to avoid any effect the polymerization may have on the color or quality of the pixels. This is particularly true in the case of thermally polymerizable polymers, since temperature can significantly effect the pitch length of the liquid crystal materials, and is why photopolymerizable polymers are preferred. The photopolymerization and the pixelization can be achieved by irradiation at different wavelengths and/or by using different photoinitiators to enable separate control of the two processes. For example, once the desired pixels are formed the entire panel may be irradiated by visible light to polymerize and spatially lock in the location of the chiral molecules so that molecular self-diffusion does not destroy the pixelization. Moreover, if the TCM additive includes polymerizable functional groups that will polymerize or cross-link with the polymer, the two can be simultaneously polymerized using a visible light photoinitiator, thereby forming a locked in network of polymer and TCM. Alternatively, a cell with grooved substrates or permanent barriers between pixels may be used to prevent diffusion, or the material may include enough polymer so that the liquid crystal is contained as droplets interspersed with the polymer, a so called PDLC material. A U.V. protective coating on the outer surface of the display after fabrication can be used to prevent further cleavage and color alteration. Such coatings are commercially available from, for example, Ciba-Geigy under the tradename Tinnvin 272 and 1130.

To prepare a black and white reflective display, a mixture of liquid crystal and the TCM is prepared as described above. This embodiment differs from the color pixelization primarily in terms of the dimension of the pixels and in the nature in which the material is addressed. If the drive scheme, e.g., electrodes, is made to address each of the colored pixels individually, the display can provide full color. On the other hand, if adjacent blue and a yellow, or three primary colored pixels are addressed simultaneously, the display will appear white because the pixels are smaller than the resolution of the eye. When disposed on a black background, the material can thus function as a black and white reflective display. The quality of the white reflection depends on the dimensions of the mask i.e., resolution of the pixels, the quality of the primary colors of the individual pixels, and the effect of any polymer added to lock in the pixels. Accordingly, what constitutes a good white appearance is to some degree a matter of subjective judgment.

There are numerous photochemical mechanisms by which the chirality of a TCM may be altered, and the particular mechanism at work will of course vary from compound to compound. However, preferred TCM's generally fall within three categories. First, there are those that racemize or isomerize upon photoirradiation or chemical reaction, such as binaphthols. Second, there are compounds whose chirality is destroyed due to the presence of a photocleavable leaving group on the chiral center, such as aryl cyano acetic acids. Third, there are compounds, such as aryl ketones, whose chirality is destroyed because they include a photocleavable chiral carbon, wherein the chiral carbon itself is part of the leaving group. The TCM'S may contain mesogenic units such as the various known biphenyls, bisphenols, aryl, heteroaryl, heterocyclic ring systems and the like, although this is not a requirement. In order to eliminate the potential for pixel diffusion, the TCM's may also include at least one polymerizable functional group, such as a polymerizable double bond, a vinyl ether, an acrylate or a methacrylate, for polymerization or cross-linking with itself and/or with any added polymer. In this way the compounds can be networked together along with any polymer in the system to lock the pixels in place.

There are countless compounds falling within the three general categories noted above. Other than the presence of a chiral carbon whose chirality can be altered (e.g., by racemization) or destroyed upon irradiation, the structural features and formulas of such compounds are not critical to the invention. There are numerous well known photochemical mechanisms by which the chirality of a compound may be destroyed or altered that may be adapted for use in the claimed invention. Those of ordinary skill in the art would be able to select and adapt such mechanisms for use in the invention in view of the present disclosure.

In accordance with the foregoing, the present invention provides a light modulating chiral nematic liquid crystal material including a chiral material adapted change chirality, i.e., the chirality is destroyed, racemized, or reversed, upon application of an energy input, preferably U.V. energy, wherein the liquid crystal material includes a plurality of essentially distinct regions within which the liquid crystal has different pitch lengths, whereby said liquid crystal can be made to reflect different wavelengths of light in different regions. Preferably, the material includes a plurality of essentially distinct region types, each of which has a pitch length effective to reflect a different color in the visible spectrum from the other of said region types i.e., different colored pixels. Still more preferably, the number of such region or pixel types is three.

In the preferred embodiment the pitch length of the liquid crystal in the three region types is effective to reflect light of a wavelength in the range selected from the group consisting of about 460 to about 480 nm, about 500 to about 520 nm, about 570 to about 585 nm, or about 630 to about 700 nm. Still further, the regions are distributed within the liquid crystal material in a pattern effective to produce images of any desired color or combination of colors. In another preferred embodiment, the liquid crystal material is interspersed with a solidified polymer matrix.

In accordance with another aspect of the invention there is provided still further an improvement in a light modulating chiral nematic liquid crystal composition. The improvement comprises a chiral material adapted to change its chirality upon application of an energy input, preferably U.V., the material being present in an amount effective to change the pitch length of the liquid crystal composition upon said input. Preferably, the chiral material includes a chiral carbon having a photo-cleavable leaving group directly bound thereto, whereby upon photo-irradiation the chiral carbon is rendered achiral, or a chiral carbon that is cleavable from said material upon photo-irradiation, whereupon the chiral carbon is rendered achiral. In another aspect of the invention, the chiral material has as its dominant reaction product upon photo-irradiation a racemic mixture, or a structural isomer of the opposite handedness of chirality. Still more preferably, the composition includes a polymer matrix forming material. In a preferred embodiment the chiral material includes at least one polymerizable double bond. Optionally, the polymer matrix forming material is polymerizable with said double bond of said chiral material.

In one embodiment, the chiral nematic liquid crystal and said chiral material have the same handedness of chirality, and in another embodiment the chiral nematic liquid crystal and the chiral material have opposite handedness of chirality. Most preferably, the chiral material is selected from the group consisting of an arylcyano acetic acid, an aryloxy acetic acid, an aryl ketone, a binaphthol, a binaphthalene or combination thereof.

In another embodiment of the invention there is provided an improved light modulating liquid crystal device comprising chiral nematic liquid crystal material adapted to form focal conic and twisted planar textures and cell wall structure confining said liquid crystal. The improvement comprises liquid crystal material including a chiral material adapted to change chirality upon application of an energy input, and a plurality of essentially distinct regions within which the liquid crystal has different pitch lengths, whereby the liquid crystal can be made to reflect different wavelengths of light in different regions. Preferably, the device includes a plurality of essentially distinct region types, each region type having a pitch length effective to reflect a different color in the visible spectrum from the other of said region types. Still more preferably there are three such region types.

In the preferred embodiment of the device the regions are distributed within said material in a pattern effective to produce images of any desired color or combination of colors. Still more preferably the device includes electrodes on the cell wall structure arranged in a manner adapted to electrically address the liquid crystal in each of said regions independently of the liquid crystal in each other of said regions. In one aspect of the invention the device includes cell wall structure treated to align the liquid crystal. Preferably, such treatment promotes homeotropic alignment of said liquid crystal.

In yet another embodiment of the invention there is provided a method of preparing a light modulating liquid crystal cell comprising the steps of disposing between a pair of cell walls, a light modulating chiral nematic liquid crystal composition including a chiral material adapted to change its chirality upon irradiation, said material being present in an amount effective to change the pitch length of the liquid crystal composition upon said irradiation; masking a portion of at least one of said substrates; and, irradiating said liquid crystal composition to change the pitch length of the unmasked portion of said liquid crystal. In one preferred embodiment the substrate is masked by an electrically addressable liquid crystalline light shutter.

In a preferred method the masking and irradiation steps are performed so as to create a plurality of essentially distinct regions within which the liquid crystal has different pitch lengths effective to reflect different colors in the visible spectrum. Still more preferably the method includes disposing electrodes on the cell walls in a manner adapted to electrically address the liquid crystal in each of said regions independently of the liquid crystal in each other of said regions. In another embodiment the method includes disposing electrodes on the cell walls in a manner adapted to electrically address the liquid crystal in a plurality of said regions simultaneously, and independently of the liquid crystal in other said regions. In a preferred method, the chiral material includes polymerizable double bonds, and is polymerized prior to said masking step. In another preferred method the liquid crystal material includes a polymer matrix forming material that is polymerized prior to said masking step.

DETAILED DESCRIPTION OF THE PREFERRED EMBODIMENTS

Figure 1:
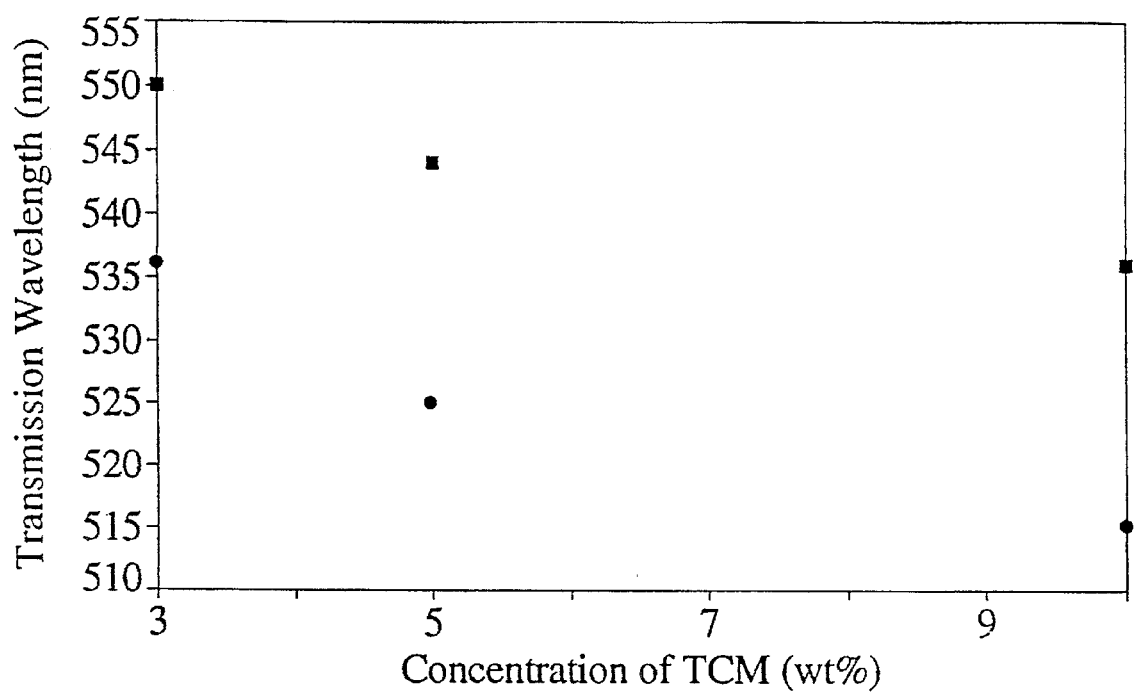
FIG. 1 is a plot showing transmission wavelength versus TCM concentration before and after UV irradiation.

The preferred embodiment resides in providing a light modulating cell comprising a liquid crystalline light modulating material and an additive material having tunable chirality, typically by photo-irradiation. The resulting mixture can then be used to form color pixels in the liquid crystal material itself for full color and black and white display applications.

The preferred liquid crystal material is a chiral nematic liquid crystal having positive dielectric anisotropy and including chiral material in an amount effective to form focal conic and twisted planar textures. Chiral nematic liquid crystal materials are preferred because of their excellent reflective characteristics, bistability and grey scale memory. The chiral nematic liquid crystal is typically a mixture of nematic liquid crystal and chiral material in an amount sufficient to produce the desired pitch length, which can thereafter be modified by the TCM additive. Suitable nematic liquid crystals include, for example, E7, E48, E31, E80, TL202, TL203, TL204 and TL205 manufactured by E. Merck. Although nematic liquid crystals having positive dielectric anisotropy, and especially cyanobiphenyls, are preferred, virtually any nematic liquid crystal known in the art, including those having negative dielectric anisotropy, should be suitable for use in the invention. Suitable chiral dopants include, for example, CB15, CE2, CE1, R1101 and TM74A, also manufactured by E. Merck. Other chiral nematic or cholesteric liquid crystals and liquid crystal mixtures suitable for use in the invention would be known to those of ordinary skill in the art in view of the instant disclosure.

An especially preferred class of liquid crystal materials with which the inventive TCM additive may be used include polymer, the polymer being distributed in the finished cell in a polymer network in an amount that provides a stabilizing or constraining effect on the pixels. In some cells, the polymer also serves to stabilize the focal conic and twisted planar textures in the absence of a field. The material used to form the polymer network is preferably soluble with the chiral nematic liquid crystal and phase separates upon solidification to form phase separated polymer domains. Suitable polymer materials include U.V. curable, thermoplastic and thermosetting polymers. Examples of suitable materials include those formed from monomers having at least two polymerizable double bonds, polymethylmethacrylates, bisacrylates, vinyl ethers, hydroxyfunctionalized polymethacrylates, urethanes, and epoxy systems to name a few. Other suitable materials would be known to those of ordinary skill in the art in view of the present disclosure. The amount of polymer to be used depends upon the polymer, liquid crystal and TCM. Useful results may be obtained with polymer contents ranging from about 0.1 to about 50% by weight based on the combined weight of polymer, chiral nematic liquid crystal and TCM. For example, cells may be prepared with a polymer content ranging from about 0.1% to 50% using certain bisacrylates, from about 2 to 40% using certain hydroxy functionalized polymethacrylates, and about 40% when certain epoxies, thermoplastics and U.V. cured polymers are used.

Preferably, the polymer content is kept low, below about 20% and more preferably below about 10%. This reduces the effect of any difference between the index of refraction of the polymer and the indices of refraction of the liquid crystal, which gives rise to "haze". Accordingly, when the polymer content is kept low the effect of any mismatch between the indices of refraction of the liquid crystal and polymer is minimized. It is to be understood, therefore, that the polymer content is subject to some variation, in as much as what constitutes a desirable or undesirable appearance of the cell in its various optical states is a matter of subjective judgment, and the need to prevent or limit diffusion from pixel to pixel may vary.

Chiral nematic liquid crystal materials and cells, as well as polymer stabilized chiral nematic liquid crystals and cells, are well known in the art and described in, for example, co-pending application Ser. No. 07/969,093 filed Oct. 30, 1992; Ser. No. 08/057,662 filed May 4, 1993; Yang et al., *Appl. Phys. Lett.* 60(25) pp 3102–04 (1992); Yang et al., *J. Appl. Phys.* 76(2) pp 1331 (1994); published International Patent Application No. PCT/US92/09367; and published International Patent Application No. PCT/US92/03504, all of which are incorporated herein by reference. Although chiral nematic liquid crystal mixtures are preferred for use in combination with the inventive TCM additives, it is contemplated within the scope of the invention that the inventive TCM additives may be used in combination with other liquid crystal materials. For example, the TCM additives of the invention may be used in combination with nematic liquid crystal alone, without the need for a separate chiral additive. In such instances the TCM's themselves will be the sole determinant of the chirality and pitch of the mixture. Moreover, other optional components that may be added to the liquid crystal mixture include dyes, chiral dyes and, for example, fumed silica to adjust the stability and appearance of the various textures.

The liquid crystal composition necessary to obtain a desired starting pitch length will vary depending upon the particular liquid crystal, chiral material and TCM used, as well as the desired mode of operation. The wavelength of the light that is reflected by the material is given by the relation $\lambda=np$, where n is the average refractive index and p is the pitch length. The band width of the reflected light $\Delta\lambda$ is given by the equation $\Delta\lambda=\lambda\Delta n/n$, where $\Delta n$ is the birefringence of the liquid crystal. Wavelengths between about 350 nm and 850 nm are in the visible spectrum. Blue light is typically considered to have a wavelength of between about 460 and 480nm, green light between about 500 and 520 nm, yellow light between about 570 and 585nm and red light between about 630 and 700 nm. Accordingly, one of ordinary skill in the art will be able to select appropriate materials for the invention and their relative concentrations based upon the refractive indices of the materials involved, their twisting power and on general principles of chiral doping of liquid crystals to obtain optimum pitches to provide a desired color. Such techniques are well known in the art as taught, for example, in the manual distributed by Hoffmann-La Roche, ltd., entitled *How to Dope Liquid Crystal Mixtures in Order to Ensure Optimum Pitch and to Compensate the Temperature Dependence*, Schedt et al., (1990), and the manual distributed by E. Merck entitled *New Chiral Dopants With High Helical Twisting Power in Nematic Liquid Crystals*, Hochgesand et al., (1989), incorporated herein by reference. Of course, what constitutes a "good" red, blue, green or yellow for a given material will also be a matter of subjective judgment and may depend upon the use to which the material will be put.

Using the preferred materials wherein the chiral nematic and TCM are of the same chirality, suitable pitch lengths for providing a good starting blue color may be obtained when the total amount of chiral material (including the TCM) is present in an amount of from about 20% to about 50% by weight based on the combined weight of chiral nematic liquid crystal and TCM. Typically, the TCM will comprise from about 1 to about 50% of the total chiral component of the mixture, although it can constitute as much as 100% of the chiral component in the mixture. Similarly, the nematic liquid crystal itself could be chiral. The desired colors for the other pixels, e.g., green, yellow, red, orange etc., are then determined by the duration or amount of photoirradiation. Similarly, using the preferred materials wherein the chiral nematic and the TCM are of opposite chirality, suitable pitch lengths for providing a good starting red color are obtained when the total amount of chiral material (including the TCM) is present in an amount of from about 10 to about 30% by weight based on the combined weight of chiral nematic liquid crystal and TCM additive. Here, the TCM will typically comprise from about 0.1 to about 50% of the total chiral component of the mixture although, as before, it can constitute the entire chiral component of the mixture. The desired colors for the other pixels are then determined by the duration or amount of photoirradiation.

In practical application, there may be a need to use more than one additive. Similarly, depending upon the application to which the material is to be put, it may be necessary to select different TCM's. For example, in order to extend the pitch change across the entire color spectrum to produce a full color display, it is preferable to select a TCM with a high helical twisting power (HTP), such as a binaphthol. Similarly, when, for example, only blue and yellow pixels are desired one can select a TCM having a lower HTP. It is to be understood that the relative amounts of TCM and chiral dopant, if any, may vary significantly depending upon the specific materials used, their twisting power and the effect of any polymer in the system. However, given the present disclosure, one of ordinary skill in the art would readily be able to determine suitable concentrations for any given combination of materials.

Any compound whose chirality can be altered or racemized by photoirradiation, e.g., U.V., laser etc., and which does not react adversely with the other components of the system is contemplated as being suitable for use in the invention. Although there are numerous photochemical mechanisms by which chirality of various compounds may be destroyed or altered, the preferred TCM's for use in the invention generally fall into three categories. One involves racemization or isomerization of the TCM compounds, and the other two involve photocleavage mechanisms. The structure of a given TCM compound will depend upon the particular photochemical mechanism employed. Since the photochemistry of these mechanisms is well known to the skilled chemist, it would be well within the skill in the art to select and synthesize suitable compounds for use in the present invention once it is decided which photochemical mechanism will be employed.

As used herein the terms straight or branched $C_{1-20}$ alkyl and $C_{1-20}$ alkoxy have their ordinary meaning, with groups having less than 12 carbon atoms being preferred. By straight or branched $C_{2-20}$ alkenyl there is intended an up to twenty carbon alkyl or alkoxy group which includes up to 10 carbon-carbon double bonds, and preferably not more than five. Alkyl, alkoxy and alkenyl groups may be substituted with halogen in the place of one or more hydrogens. Such groups include perfluoroalkyl and perfluoroalkoxy groups. By aryl there is intended a saturated or unsaturated 5 or 6 membered carbocyclic ring, and by heteroaryl there is intended a saturated or unsaturated 5 or 6 membered heterocyclic ring with one to three heteroatoms being selected from O, S or N, wherein said carbocyclic or heterocyclic rings may be fused with one to three saturated or unsaturated carbocyclic or heterocyclic rings. By saturated or unsaturated, fused or unfused carbocyclic ring there is contemplated, for example, cyclopentane, cyclohexane, benzene, naphthalene, indene, anthracene, phenanthrene and the like. By saturated or unsaturated, fused or unfused, heterocyclic ring there is contemplated, for example, oxazole, thiazole, imidizole, pyradine, piperadine, pyrimidine, pyrazine, piperazine, quinoline, isoquinoline, indole, acridine and the like.

There are basically two ways to destroy the chirality of a molecule through photocleavage, one being to eliminate a group or substituent from the chiral carbon thereby rendering the carbon achiral, and the other being to cleave the chiral carbon itself from the molecule, which destroys the chirality of both the original molecule and the leaving group. Both of these methods find their basis in synthetic organic chemistry, where photoremovable protecting groups are frequently used during synthesis. The essence of both is to select a known photoremovable protecting group as is known in the art, and then to employ it in a position where the removal of the protecting group destroys the chirality of the compound. Photoremovable protecting groups are discussed in some detail in Binkley, R. W., et al., *Synthetic Organic Chemistry*, Plenum Press, New York, N.Y. (1984) (Chapter 7, pp. 375–423), incorporated herein by reference. Known photoremovable protecting groups include esters of sulfonic acids, carboxylic acids and carboxylic acid esters, hydrazones (e.g., N,N-dimethylhydrazones), acetal forming dithio groups, 1,2-diphenylmaleimides, o-nitrophenylamino groups, aryl azido ethers, benzoin esters (e.g., methoxy substituted benzoin esters), polymer bound phenacyl groups, phenacyl groups (e.g., methoxyphenacyl), and benzyloxycarbonyl compounds. When incorporated into the structure of a chiral compound, such groups can be used to destroy the chirality of the compound upon photoirradiation. The selection of appropriate groups for use in a TCM will depend upon the compatibility of the particular TCM and the photoirradiation reaction products thereof with the other components in the system.

The first preferred category of TCMs includes a photocleavable leaving group directly attached to the chiral carbon. Upon U.V. irradiation, the bond between the chiral carbon and the leaving group is cleaved, thereby destroying the chirality of the TCM compound. There are numerous photochemical mechanisms by which a labile substituent on a chiral carbon may be eliminated by photoirradiation. Accordingly, there are countless compounds falling within this category. However, as noted above, the chemical mechanisms are well known and those of ordinary skill in the an will know the necessary structural requirements needed for a compound to photocleave with destruction of chirality according to a given mechanism. Preferred compounds of this category are typically characterized by an aromatic ring or ring system having the chiral carbon bound to it directly, beta to the ring through a carbon, a substituted carbon or a heteroatom such as oxygen or sulfur. This is because the aromatic ring or ring system acts to increase the lability of the leaving group. To enhance this function of the ring or ring system it may often be activated by various electron withdrawing substituents such as one or more nitro groups as is known in the art. Attached to the chiral carbon will be a photocleavable leaving group, such as a carboxylic acid, a carboxylic acid ester, or the like. Other suitable leaving groups and the structural requirements for their photo-lability would be known in the art. In addition, the chiral carbon may also frequently include electron withdrawing groups, such as a cyano group, to increase the lability of the leaving group. Examples of such compounds include aryl cyano acids, aryloxy acetic acids, α-aryl propionic acids, benzoin esters, and the like.

As noted, the structure, synthesis and chemistry of such compounds are determined substantially by the specific photochemical mechanism at work, and would be known to those of ordinary skill in the art in view of the instant disclosure. For example, when one desires to utilize the well known mechanism of photodecarboxylation of an acid group, aryl cyano acids, aryloxy acetic acids and arylcyano acetic acids are commonly employed. These well know photochemical techniques as well as other photochemical techniques suitable for adaptation to the present invention are well understood in the field of synthetic organic chemistry as discussed in, for example, Coyle, J. D., *Introduction to Organic Photochemistry*, John Wiley & Sons (1986) (Chapter 4, pp 107–111); Cameron et al., *J. Am. Chem. Soc.*, Vol. 113, No. 11, pp 4303–4313 (1991); Sonawabe et al., *Tetrahedron Asymmetry*, Vol. 3, No. 2, pp. 163–192 (1992); and Davidson et al., *J. Chem. Soc. Perkin II*, p 1357 (1972), all of which are incorporated herein by reference. Those of ordinary skill in the art would be able to select and synthesize appropriate TCMs within this category in view of the instant disclosure.

Since the chemistry of photodecarboxylation is one of the better understood mechanisms, compounds of this category having of photocleavable carboxylic acid group are particularly suitable for adaptation to use as TCMs. In these compounds, the chiral carbon may be either directly alpha to the ring or ring system, such as in the arylcyano acetic acid shown in formula 1 below, or may be beta to the ring or ring system through a bond or heteroatom such as in the aryloxy acetic acid shown in formula 2 below.

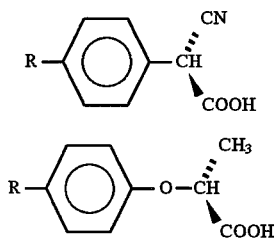

In these photochemical reactions, the leaving group is a photocleavable carboxylic acid or acid ester, the lability of which may be enhanced by the inclusion on the chiral center of an electron withdrawing group such as a cyano group, or by forming the chiral carbon beta to the ring system through a heteroatom such as oxygen or sulfur, as in the formulas above. Upon U.V. irradiation, the acid moiety is eliminated as $CO_2$ thereby destroying the chirality of the compound, as conceptually shown in Schemes 1 and 2 below.

Scheme 1

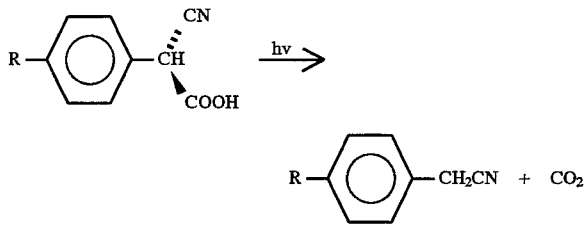

Scheme 2

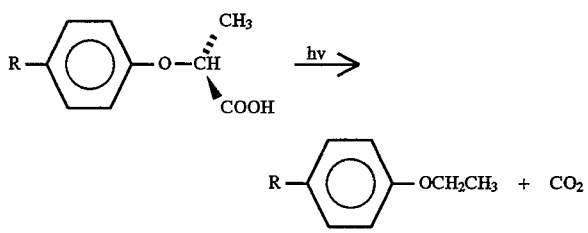

The preferred TCM compounds according to the present invention which employ the mechanism of photodecarboxylation are compounds of the general formula I:

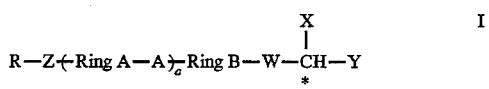

R is selected from hydrogen, straight or branched $C_{1-20}$ alkyl, straight or branched $C_{1-20}$ alkoxy, straight or branched $C_{2-20}$ alkenyl, each of which may be substituted with halogen in the place of one or more hydrogens, or R may be $R_1OR_1-$, $R_1CO_2R_1-$, $R_1O_2CR_1-$, $R_1HC=CR_1-$, $R_1C\equiv CR_1-$, wherein $R_1$ may be a single bond, straight or branched $C_{1-20}$ alkyl, straight or branched $C_{1-20}$ alkoxy or straight or branched $C_{1-20}$ alkenyl, or R may be $CH_2=CHR'CO_2(CH_2)_m-R''-$, $CH_2=CHR'CONH(CH_2)_m-R''-$, wherein R' can be H or $CH_3$, R'' can be a bond, oxygen or sulfur and m is an integer from 0 to 12, or R may be $CH_2=CHR'COS(CH_2)_m-R''-$, wherein R' is halogen and R'' and m are as described above, or R may be a polymerizable siloxane of the formula

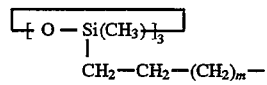

or R can optionally be nothing.

Z is selected from hydrogen, a single bond, halogen, oxygen, sulfur, nitrogen, a carboxyl group, a thionyl group, an amide group, —C=C— or —C≡C—.

The group —Z—R may optionally be terminated by a polymerizable siloxane to form the group

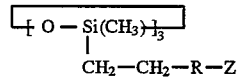

Ring A may be a biphenyl group, a bicyclo(2.2.2)octane, a saturated or unsaturated 5 or 6 membered carbocyclic ring or a saturated or unsaturated 5 or 6 membered heterocyclic ring with one to three heteroatoms being selected from O, S or N, wherein said carbocyclic or heterocyclic ring may be fused with one to three saturated or unsaturated carbocyclic or heterocyclic rings. By saturated or unsaturated, fused or unfused carbocyclic ring there is contemplated, for example, cyclopentane, cyclohexane, benzene, naphthalene, indene, anthracene, phenanthrene and the like. By saturated or unsaturated, fused or unfused, heterocyclic ring there is contemplated, for example, oxazole, thiazole, imidizole, pyradine, piperadine, pyrimidine, pyrazine, piperazine, quinoline, isoquinoline, indole, acridine and the like.

The number of R—Z— groups on each ring in Ring A may be from zero to four.

Link A can be a single bond, —CH$_2$CH$_2$—, —CH$_2$O—, —OCH$_2$—, oxygen, sulfur, nitrogen, carboxyl, thionyl, amide, or —C≡C—.

The subscript "a" can be an integer from 0 to 2, wherein when a=0, the group or groups R—Z— may be attached to the Ring B.

Ring B is biphenyl, naphthalene, or an aromatic six membered carbocyclic or heterocyclic ring which may contain from one to four heteroatoms selected from O, S, or N, and which may be substituted with up to four of the groups R—Z—.

W is a single bond, N, O or S.

X is CH$_3$, halogen or CN, with the proviso that when W is a single bond, then X is halogen or cyano, or X may be the same as ZR, with the proviso that X is not hydrogen.

Y is —CO$_2$H.

The specific configuration of the chiral carbon may be (R) or (S).

Preferred compounds of the general formula I are shown in Table 1.

TABLE 1

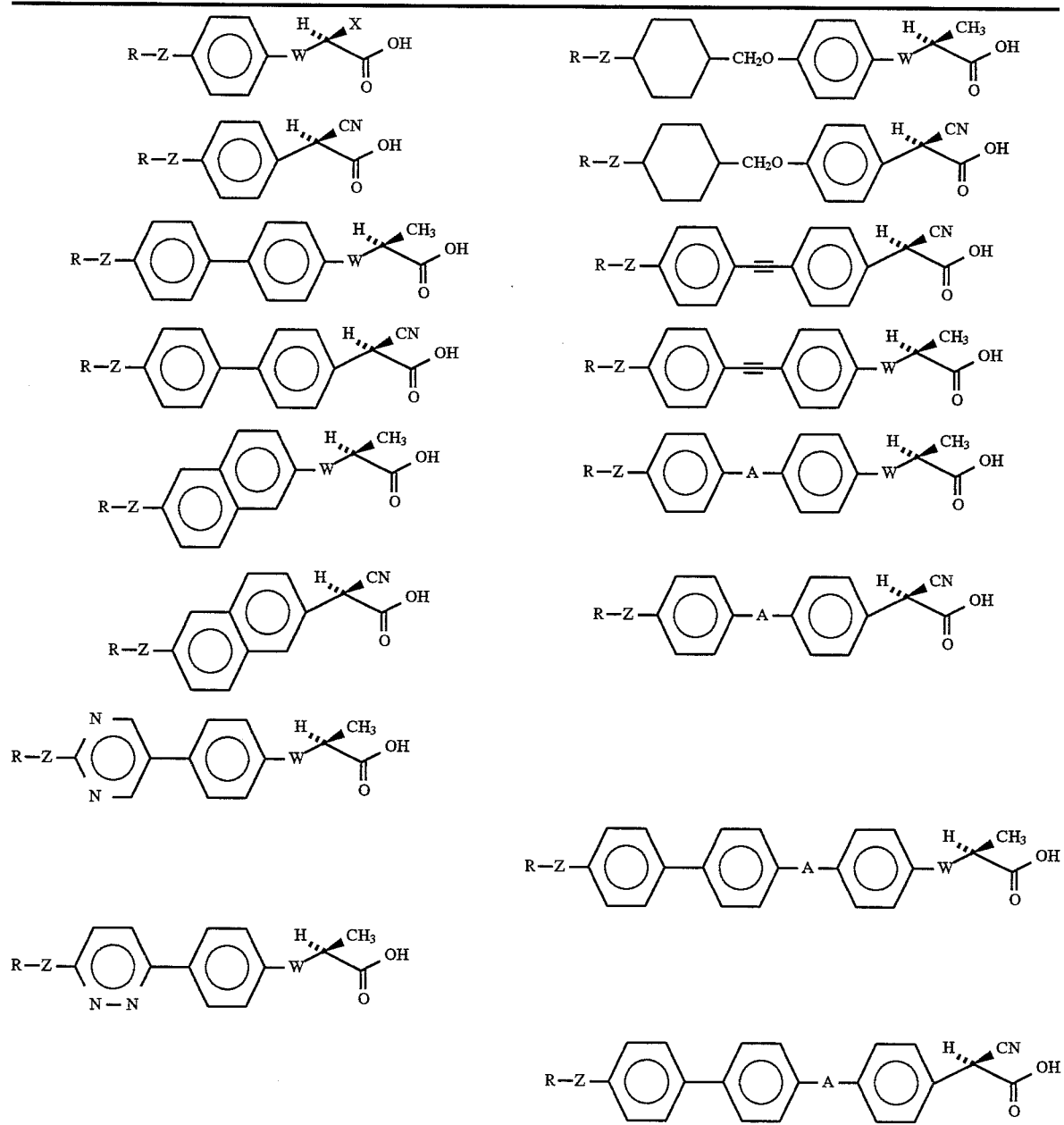

TABLE 1-continued
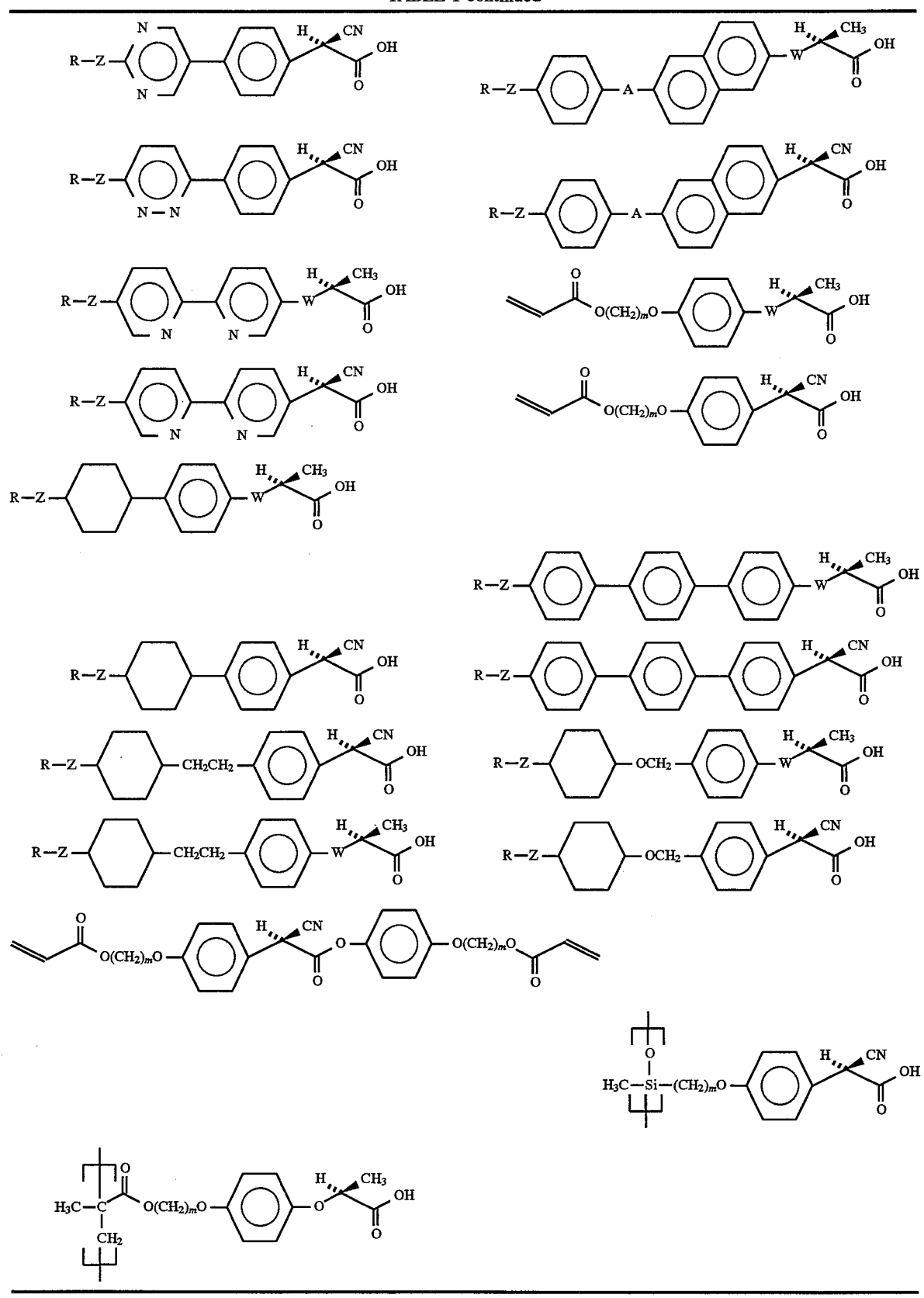

Compounds of the formula I, for example those listed in Table 1, may be easily synthesized by those having ordinary skill in the art using known synthetic techniques and starting materials readily available from, for example, Aldrich Chemical Company, or variants of these which would be apparent to a skilled chemist. As examples, sample synthesis are shown below in Schemes 3 and 4.

Scheme 3

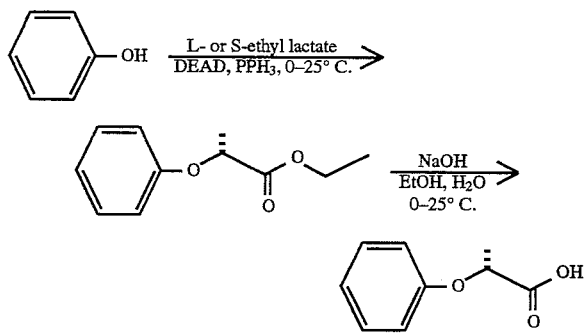

Scheme 4

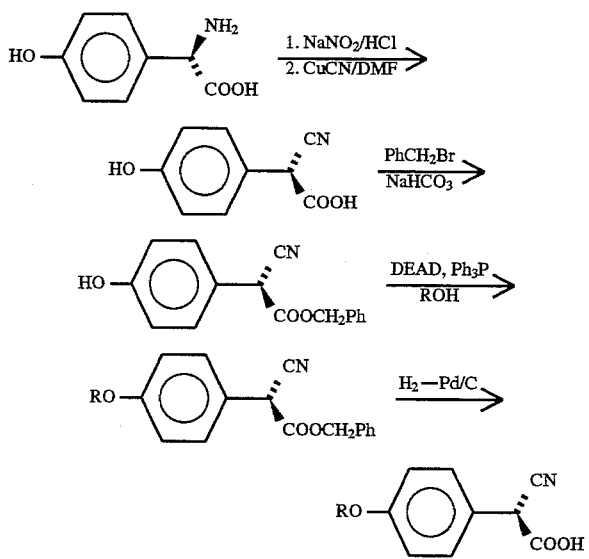

The compounds of formula I may be synthesized in an analogous manner to the schemes shown and to the following non-limiting examples, or variations thereof which would be apparent to those of ordinary skill in the art.

EXAMPLE 1

The compound (2R)-(±)-2-methyl-2-phenyloxy-acetic acid was synthesized in a two step process as follows. The Mitsunobu reaction was used to obtain a chiral ester, followed by a basic saponification of the ester to obtain the final product. Specifically, a solution of 4 g (42.5 mmol) phenol, 5.0 g (42.5 mmol) (2s)-(−)-ethyl lactate and 11.1 g (42.5 mmol) triphenylphosphine in 50 ml anhydrous THF was cooled in an ice bath. 7.4 g (42.5 mmol) diethylazodicarboxylate (DEAD) was added dropwise over a period of 3 minutes. The mixture was allowed to stir for 24 hours. The volume of the mixture was then reduced by evaporation in vacuo at 30° C. The mixture was diluted with 50 ml of diethylether, and precipitated triphenylphosphineoxide was removed by filtration. The filtrate was evaporated using a rotavap at 30° C. and the resulting oil was purified by flash column using silica-gel with dichloromethane as the eluent. This resulted in a 6.7 gram yield of the chiral ester (2R)-(+)-1-phenyloxy-1-methyl acetic acid ethyl ester.

A solution of 2.48 g (61.92 mmol) NaOH dissolved in 48 ml EtOH and 14 ml water was prepared and cooled to 0° C. and added to the 6 g of chiral ester. The reaction mixture was homogeneous immediately. The solution was stirred overnight. Excess solvent was removed using a rotavap at 30° C. The crude residue was diluted with 50 ml of $Et_2OH$ and 50 ml of water. After cooling to 0° C. the mixture was acidified with concentrated HCl. The two layers were separated and the aqueous layer was extracted once with 50 ml $Et_2O$. The combined ether phase was dried over magnesium sulfate, evaporated with a rotavap at 30° C. and the residue was chromatographed by flash column with $Et_2O$ as the eluent, followed by recrystallisation in hexane and a few drops of $Et_2O$ to yield 1.14 g of the final product.

EXAMPLE 2

The compound (2R)-(+)-2-(4-pentyloxy)-phenyloxy-2-methyl-acetic acid was prepared as follows. This synthesis started with a Williamson etherification. The acidic phenolic proton was abstracted by using $K_2CO_3$ as the base. The resulting phenolate anion reacts with 1-bromo-pentane in an $S_N2$-substitution. After removing benzylic ether, which protected the other hydroxy group, the resulting phenol was transformed in two steps using the Mitsunobu reaction and basic saponification in the manner disclosed in the preceding example, obtaining the chiral acid.

30 g (150 mmol) 4-(benzyloxy)phenol and 22.35 g 1-bromo-pentane (150 mmol) were dissolved in 250 ml acetone. The solution was heated to 80° C. and stirred with a mechanical stirrer. At this temperature, 118.5 g $K_2CO_3$ (1.09 mol) was added in one portion. The resulting heterogeneous solution was allowed to stir at 80° C. for 16 hours. The reaction was monitored by TLC until completion. Excess $K_2CO_3$ and the byproduct KBr were removed by filtration. The solution was then acidified with concentrated HCl. Evaporation of the solvent resulted in a light yellow colored oil. No further purifications were needed to obtain the 1-pentyloxy-4-(benzyloxy)phenyl ether intermediate.

To deprotect the other hydroxyl group 12.16 g (47 mmol) of above-noted intermediate was mixed with 40 ml THF, 15 ml ethanol and 0.6 g Pd/C (10%) in a flask. The debenzylation was done in a hydrogenation apparatus. The reaction mixture was carried out overnight with shaking while the reaction was monitored by TLC. The solution was passed through a short flash column to remove the catalyst and the solvent was removed using a rotavap at 30° C. The crude 4-pentyloxyphenol intermediate was light yellow and no further purification was made.

A Mitsunobu reaction was carried out on this product in the manner disclosed in the preceding example to yield (2R)-(±)-2-(4-pentyloxy)-phenyloxy-2-methyl acetic acid ethyl ester. Then the basic saponification as recited in the preceding example was carried out to obtain the final product.

EXAMPLE 3

The compound (2R)-(±)-2-(4'-pentyloxy)-biphenyl-4-yloxy-2-methyl acetic acid was prepared as follows. First, the compound 4-hydroxy-(4'-pentyloxy)biphenyl was prepared in a manner similar to the phenyl ether in the preceding example. 20 g (107.5 mmol) 4,4'-biphenol was dissolved in 500 ml acetone at 70° C. with stirring. The reaction was allowed to cool to 40° C. and 89 g (645 mmol) $K_2CO_3$ was added in one portion. After heating to 70° C., 14.6 g (96.8 mmol) 1-bromo-pentane was added dropwise over a period of 1 min. The heterogeneous mixture was maintained at 70° C. for 14 hours. Another 40 g (290 mmol) $K_2CO_3$ was added and the reaction was continued for 8 hours. The reaction mixture was filtered through a Buechner funnel to remove excess $K_2CO_3$ and byproduct KBr. The solution was then acidified with concentrated HCl. The resulting crude compound was recrystallized in acetone/ethanol (8:1) to obtain the disubstituted biphenyl. The solvent of the filtrate was evaporated in vacuo at 30° C. and the resulting mixture purified using a flash column with dichloromethane as the eluent.

A solution was prepared with 8.07 g (30 mmol) of the biphenyl, 3.55 g (30 mmol) (2S)-(−)-ethyl-lactate and 7.89 g (30 mmol) triphenylphosphine in 50 ml anhydrous THF and cooled in an ice bath. 5.24 g (30 mmol) diethylazodicarboxylate (DEAD) was added dropwise over a period of 3 minutes. Upon completion of the Mitsunobu reaction, a basic saponification was conducted as in the preceding example to obtain the final product.

The photo-tuning of such compounds in accordance with the invention then proceeds as conceptually exemplified in Schemes 5 and 6 below, for example.

Scheme 5

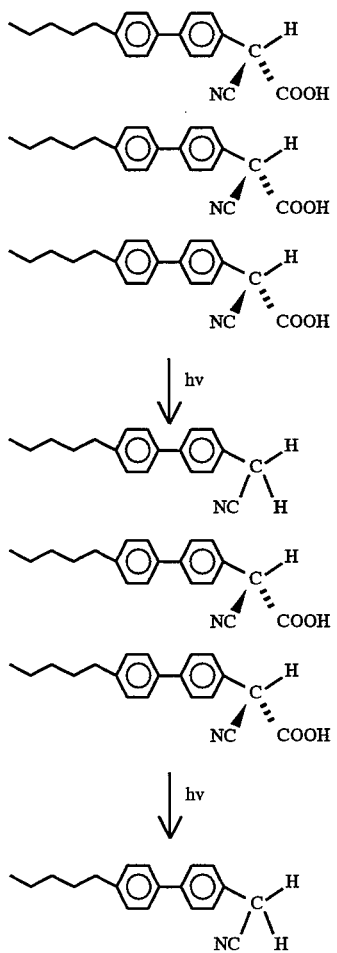

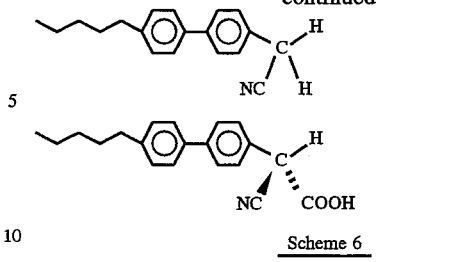

Scheme 6

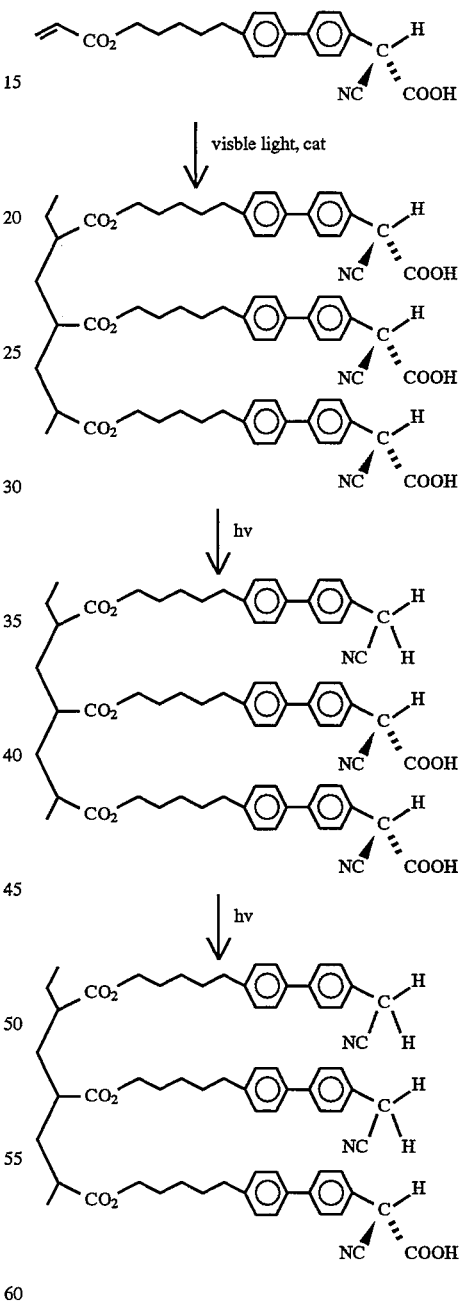

The second class of TCM compounds utilizes a cleavage of the chiral center itself from the molecule to destroy the chirality of the molecule, i.e., the bond to the chiral carbon is cleaved such that the chiral carbon forms a part of the leaving group. As with the first category of compounds described above, the chiral centers here are typically attached to an aromatic ring or ring system, either directly or through a carbon, a substituted carbon, or a heteroatom such as oxygen or sulfur. The important aspect of these compounds is that the leaving group, including the chiral carbon, be subject to photo-elimination rendering both the original compound and the leaving group achiral. TCMs of this type are, for example, aryl ketones, wherein the chiral carbon is alpha to the keto group. The keto group is bound to an aromatic ring or ring system to enhance the lability of the alpha leaving group. These compounds employ the well know mechanism of alpha cleavage of the carbon alpha to the aryl ketone and are especially preferred. The photochemistry of alpha-cleavage has been known for decades and is readily adapted to the claimed utility by those of ordinary skill in the art in view of the instant disclosure. For example, the photochemistry of the alpha-cleavage is discussed at length in Chapter 13 of Turro, *Modern Molecular Photochemistry*, The Benjamin/Cummings Publishing Co., Inc., (1978), and the footnotes therein, and by Lewis et al., *J. Am. Chem. Soc.* 95:18, pp 5973–76 (1973), all of which are incorporated herein by reference.

The essence of this chemistry is in the photocleavability of a leaving group in the alpha position to a carbonyl, in particular, alpha to a ketone group. The susceptibility of alpha leaving group to photo-cleavage is most pronounced when the keto group is directly attached to an aromatic ring, which provides an excellent electron withdrawing sink rendering the alpha-leaving group (beta to the ring) particularly labile. Hence, especially preferred compounds according to this embodiment are aryl ketones. When the alpha carbon is a chiral center, such compounds will have photo-tunable chirality. Accordingly, these compounds are excellent additives to adjust the chirality of a liquid crystal composition. Upon U.V. irradiation, the bond between the keto carbon and alpha carbon is easily cleaved, eliminating the chiral center and thereby destroying the chirality of the molecule and the leaving group.

Therefore, the preferred α-cleavable TCM compounds are aromatic ketones generally characterized by a keto group directly attached to an aromatic ring or ring system, and a chiral center alpha to the keto group. The aromatic ring or ring system may be mesogenic, although this is not a requirement. Suitable aromatic groups include substituted or unsubstituted phenyls, biphenyls, aryls, heteroaryls and the like. The synthesis of compounds having these minimum requirements would be well known to those of ordinary skill in the art. It is contemplated that virtually any such compounds fulfilling these minimum requirements will have photo-tunable chirality and be suitable for use in the instant invention.

A preferred class of α-cleavable TCMs is shown by the general formula II below.

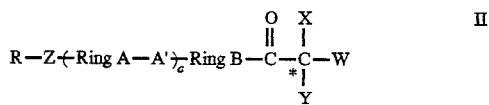

R is selected from hydrogen, straight or branched $C_{1-20}$ alkyl, straight or branched $C_{1-20}$ alkoxy, straight or branched $C_{1-20}$ alkenyl each of which may be substituted with halogen in the place of one or more hydrogens, or R may be $R_1OR_1$—, $R_1CO_2R_1$—, $R_1O_2CR_1$—, $RHC=CR_1$—, $R_1C\equiv CR_1$—, wherein $R_1$ may be a single bond, straight or branched $C_{1-20}$ alkyl, straight or branched $C_{1-20}$ alkoxy, or straight or branched $C_{1-20}$ alkeyl, or R may be $CH_2=CHR'CO_2(CH_2)_m$—R"—, $CH_2=CHR'CONH(CH_2)_m$—R"—, wherein R' can be H or $CH_3$, R" can be a bond, oxygen or sulfur and m is an integer from 0 to 12, or R may be $CH_2=CHR'COS(CH_2)_m$—R"—, wherein R' is halogen and R" and m are as described above, or R may be a polymerizable siloxane of the formula

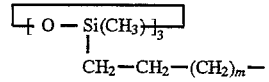

or R can optionally be nothing.

Z is selected from hydrogen, a single bond, halogen, oxygen, sulfur, nitrogen, a carboxyl group, a thionyl group, an amide group, —C=C— or —C≡C—.

The group —Z—R may optionally be terminated by a polymerizable siloxane to form the group

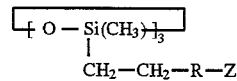

Ring A may be a biphenyl group, a bicyclo(2.2.2)octane, a saturated or unsaturated 5 or 6 membered carbocyclic ring or a saturated or unsaturated 5 or 6 membered heterocyclic ring with one to three heteroatoms being selected from O, S or N, wherein said carbocyclic or heterocyclic ring may be fused with one to three saturated or unsaturated carbocyclic or heterocyclic rings. The number of R—Z— groups on each ring in Ring A may be from zero to four.

The subscript "a" can be an integer from 0 to 2, wherein when a=0, the group or groups R—Z— may be attached to the Ring B.

Link A can be selected from a single bond, —$CH_2CH_2$—, —$CH_2O$—, —$OCH_2$—, oxygen, sulfur, nitrogen, a carboxyl group, a thionyl, an amide group or —C≡C—.

Ring B is phenyl, biphenyl, naphthalene, or an aromatic six membered carbocyclic or heterocyclic ring which may contain from one to four heteroatoms selected from O, S, or N, and which may be substituted with up to four of the groups R—Z—.

X is selected from H, —$CH_3$, —OH, —R, —OR, —SR, —OPh or —SPh.

Y is selected from —R, —OR or —SR, with the proviso that X and Y are different, or X and Y may come together to form a five to eight membered carbocyclic ring.

W may be selected from R, —Z—R, —NHZR, —N(ZR)$_2$, halogen, halogenoalkyl, —$CO_2$—Z—R, —$O_2$C—Z—R, -ph-(Z—R)$_b$, —$CO_2$-ph-(Z—R)$_b$, —$O_2$C-ph-(Z—R)$_b$, a biphenyl group in which each ring may be unsubstituted or substituted with up to four —ZR groups, or a saturated or unsaturated 5 or 6 membered carbocyclic ring, or a saturated or unsaturated 5 or 6 membered heterocyclic ring with one to three heteroatoms being selected from O, S or N, wherein said carbocyclic or heterocyclic ring may be fused with one to three saturated or unsaturated carbocyclic or heterocyclic rings, wherein the number of R—Z— groups on each ring may be from zero to four.

The subscript "b" is an integer from 0 to 4.

The specific configuration of the chiral carbon can be R or S.

Compounds of the formula II may be easily synthesized by a number of preparative routes starting from known starting materials, or by variants of these, which will be apparent to the skilled chemist in view of the present disclosure. Preferred compounds according to formula II are shown below in Table 2.

TABLE 2
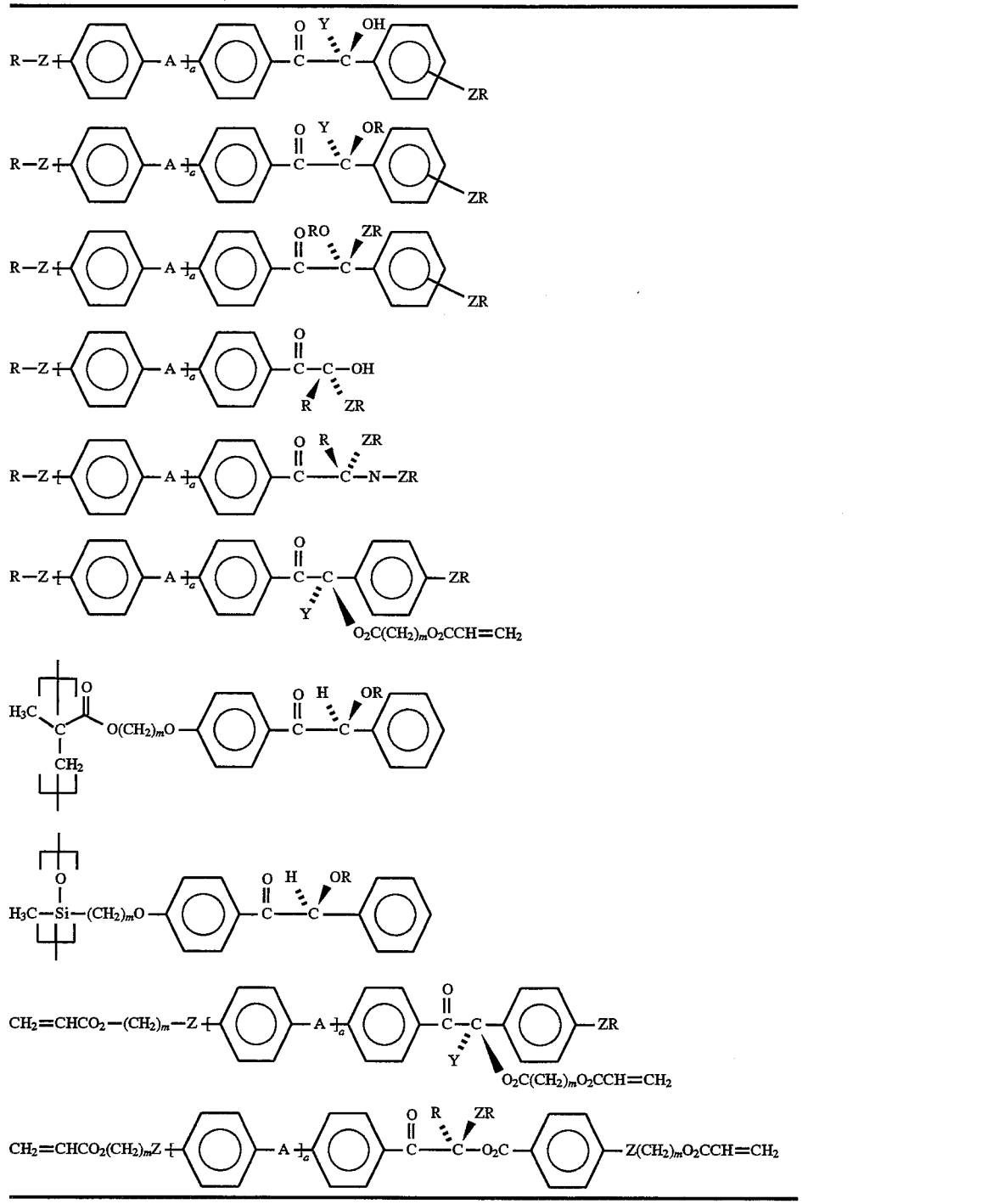
The synthesis of a typical chiral benzoin according to formula II is shown below in Scheme 7.
Scheme 7
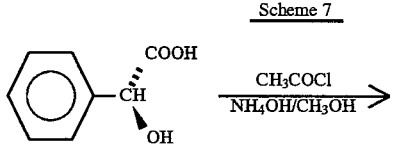
-continued
Scheme 7
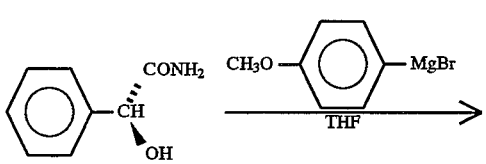

-continued
Scheme 7

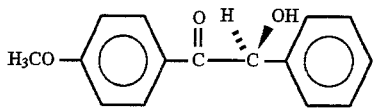

The synthesis of a typical (S)-(+) 1-(4-methoxyphenyl)-2-hydroxy propane is illustrated below in Scheme 8.

Scheme 8

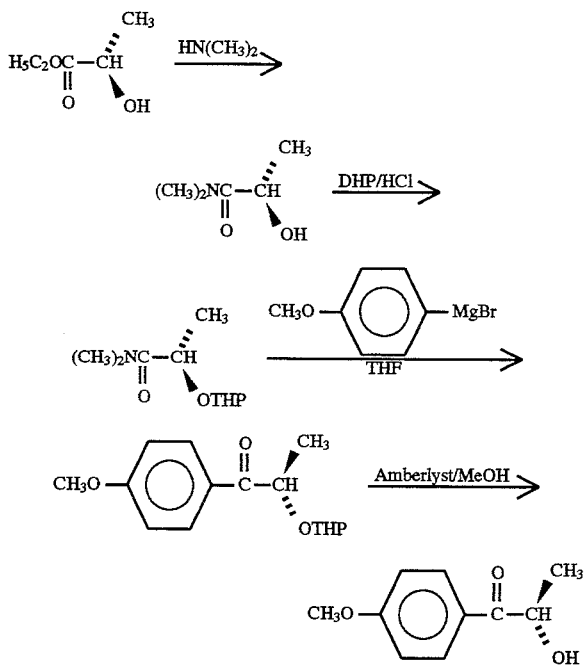

The synthesis of various compounds of the formula II would be known to those of ordinary skill in the art from schemes shown and the following non-limiting examples or variants thereof which would be apparent to the skilled chemist.

EXAMPLE 4

The compound (R)-1-(4-methoxyphenyl)-2-hydroxy-2-phenylacetone was prepared as follows. To a solution of 260 ml methanol and 10 g (0.065 mol) mandelic acid was added 4 ml of acetyl chloride at 0° C. After the solution was stirred overnight at room temperature, the solvent was evaporated under reduced pressure and 121 ml of ammonium hydroxide in 50 ml of methanol was added. The mixture was then stored in the refrigerator overnight. A (R)-mandelamide was filtered and purified by recrystallization from ethanol.

To an ice-bath-cooled solution of 4-methoxyphenyl magnesium bromide (29.7 g of bromoanisole, 3.8 g of Mg and 30 ml THF) 3.8 g (0.0265 mol) of the mandelamide was added. The mixture was refluxed for two days. The resulting solution was extracted with ethyl ether and washed with an aqueous solution of 2N sulfuric acid. The organic layer was separated, dried with magnesium sulfate and the solvent was evaporated on a rotavap. The crude was purified by column chromatography using silica gel and hexane/ethyl acetate (4:1) as the eluent to obtain the final product.

EXAMPLE 5

(S)-(+) 1-(4-methoxyphenyl)-2-hydroxy propanone was prepared as follows. 20 g (0.44 mol) anhydrous dimethylamine was added to 39.6 g (0.335 mol) ethyl lactate at 0° C. The mixture was stirred in a sealed vial at 70° C. for one day and excess dimethylamine and resulting ethanol were removed under reduced pressure. An additional 12 g (0.266 mol) anhydrous dimethylamine was added to the residue and the mixture was further stirred at 70° C. for an additional one day to complete the amidolysis. After complete removal of excess dimethylamine and resulting ethanol using a rotavap, an (S)-N,N dimethyllactamide intermediate was purified by distillation.

A mixture of 5 g (0.042 mol) of the dimethyllactamide, 3.6 g (0.042 mol) 3,4,-dihydro-2H-pyrane and 4 drops HCl were added in a flask. The mixture was stirred at room temperature for 16 hours. The mixture was then diluted with ethyl ether, washed with a solution of sodium bicarbonate and the ether removed under reduced pressure to obtain (S)-2-O-tetrahyropyrane-N,N-dimethyllactamide upon purification by distillation.

The 4-methoxyphenyl magnesium bromide reagent was prepared separately in the usual manner as follows. A solution of 0.61 g Mg, 4.65 g 4-bromoanisole in 10 ml of dry THF was prepared and cooled. Then 5 g (0.025 mol) of the tetrahydropyrane lactamide above in 10 ml of THF was added dropwise under nitrogen. The resulting solution was stirred for one hour, the THF was evaporated and the mixture was washed with a solution of ammonium chloride. The solution was extracted with ether, dried over magnesium sulfate and the ether was removed under reduced pressure. The crude (S)-2-O-tetrahydropyrane-1-(4-methoxyphenyl)-1-propanone product was purified by column chromatography using silica gel and hexane/ethyl acetate (4:1) as the eluent. Finally, a mixture of 1 g (0.0038 mol) of this intermediate and 200 mg of Amberlyst in 40 ml methanol was prepared in a round bottom flask. The solution was heated at 60° C. for 12 hours. The resulting solution was filtered, and the solvent was evaporated, extracted with ether and purified with column chromatography to obtain the final product.

The photocleaving mechanism of the preferred benzoketals according to formula II is illustrated in Scheme 9 below.

Scheme 9

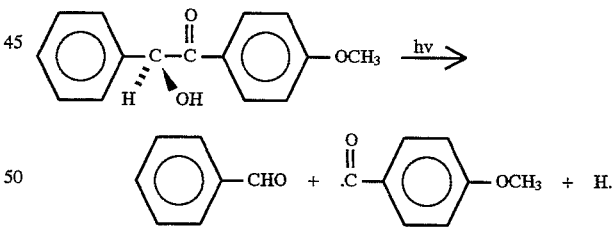

Upon UV irradiation, the compounds will cleave between the α-carbon atom and the adjacent beta chiral carbon, thereby destroying the chirality of the compound.

It should be noted here that the photochemistry of alpha aryl ketones and other compounds can often be quite complex, with numerous competing reactions, such as radical recombination with retention of chirality, radical recombination with racemization, and degeneration with destruction of chirality. In the case of the aryl ketones and carboxylic acids described above, the later reaction dominates, with the racemization reaction path being secondary. Advantageously, both reaction paths serve to change the pitch and hence, color of the liquid crystal mixture in accordance with the method of the invention. The important aspect of both of the above-described categories of photocleaving compounds is that the dominant reaction pathway leads to the destruction of chirality through the elimination of a photocleavable substituent.

As can be seen from the formulas and reaction schemes above, the important structural characteristics of the TCMs are those pertaining to photocleavage, i.e., the nature of the leaving group and location of the chiral carbon. The remaining structure of the molecule is not critical to the invention as long as it does not adversely react with the remaining components of the system or deleteriously effect the color. Those of ordinary skill in the art will know to exclude those materials that do not provide suitable results, for example, due to inadequate twisting power, or chemical incompatibility and the like.

One drawback of the photocleaving mechanisms is that they produce reaction by-products which remain in the system. As a result, in instances where the TCMs form a part of a polymerizable network, e.g. with other TCMs, with polymer in the system or both, it may be advantageous that both of the resulting reaction products include a polymerizable ligand. In this way, the leaving group may be cleaved from the rest of the TCM molecule, but both will remain bound to the polymer network. Such systems are advantageous because they bind up the photocleaved reaction products so that they do not "float" around in the system as unwanted reaction by-products.

The third class of TCM compounds are generally characterized by molecules in which the dominant reaction pathway does not destroy chirality by cleavage but instead changes the proportion of the TCM having a given chirality, e.g., by racemization or isomerization. These compounds have the advantage of not producing cleavage by-products in the mixture. An especially preferred class of these compounds are binaphthols, in which the process of changing the chiral concentration, i.e., pitch length, of the cholesteric mixture is believed to be through the racemization. As with the previous systems, the addition of a binaphthol of the same chirality as the liquid crystal mixture will initially shorten the pitch length, while the addition of a binaphthol TCM of the opposite chirality will initially extend the pitch length of the mixture. Upon U.V. irradiation the binaphthol TCM will racemize thereby extending or shortening the pitch of the mixture depending on the initial chirality of the liquid crystal mixture. Masking and color adjustment proceeds in the same manner as the other TCM systems. An advantage of these materials is that they provide for photo-tunable chirality without the discharge of small molecules as reaction products associated with photocleavage. Thus, while polymer may still be required to prevent pixel diffusion, it is not necessary to use the polymer to bind up reaction products. Moreover, many of these compounds resist pixel diffusion and so can provide a good multicolor display without significant need for polymer stabilization. Yet another advantage associated with this embodiment is that highly chiral binaphthols are readily commercially available from, for example, Aldrich Chemical Company.

Preferred binaphthols useful as TCMs for pixelization arc chiral (R or S) binaphthols of the formula III.

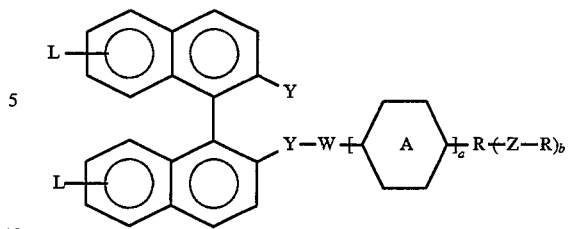

Y is O, OH, S, SH or $NH_2$.

R is selected from hydrogen, straight or branched $C_{1-20}$ alkyl, straight or branched $C_{1-20}$ alkoxy, straight or branched $C_{1-20}$ alkenyl, each of which may be substituted with halogen in the place of one or more hydrogens, or R may be $R_1OR_1$—, $R_1CO_2R_1$—, $R_1O_2CR_1$—, $R_1HC$=$CR_1$—, $R_1C$≡$CR_1$, wherein $R_1$ may be a single bond, straight or branched $C_{1-20}$ alkyl, straight or branched $C_{1-20}$ alkoxy, each of which may carry up to five carbon-carbon double bonds, or R may be $CH_2$=$CHR'CO_2(CH_2)_m$—R"—, $CH_2$=$CHR'CONH(CH_2)$—R"—, wherein R' can be H or $CH_3$, R" can be a bond, oxygen or sulfur and m is an integer from 0 to 12, or may be a polymerizable siloxane of the formula

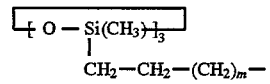

or R can optionally be nothing.

Z is selected from hydrogen, a single bond, halogen, oxygen, sulfur, nitrogen, a carboxyl group, cyano, a thionyl group, an amide group, —C=C— or —C≡C—.

The group —Z—R may optionally be terminated by a polymerizable siloxane to form the group

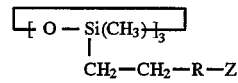

L is the same as —Z—R and the number of L groups may be from 0 to 6.

W is selected from a, single bond, —CO—, or —OCNH—.

Ring A may be a biphenyl group, a bicyclo(2.2.2)octane, a saturated or unsaturated 5 or 6 membered carbocyclic or a saturated or unsaturated 5 or 6 membered heterocyclic ring with one to three heteroatoms being selected from O, S or N, wherein said carbocyclic or heterocyclic ring may be fused with one to three saturated or unsaturated carbocyclic or heterocyclic rings. The number of R—Z— groups on each ring in Ring A may be from zero to four.

The subscripts "a" and "b" can be a integer from 0 to 2.

Preferred compounds of the general formula III are shown in Table 3

TABLE 3

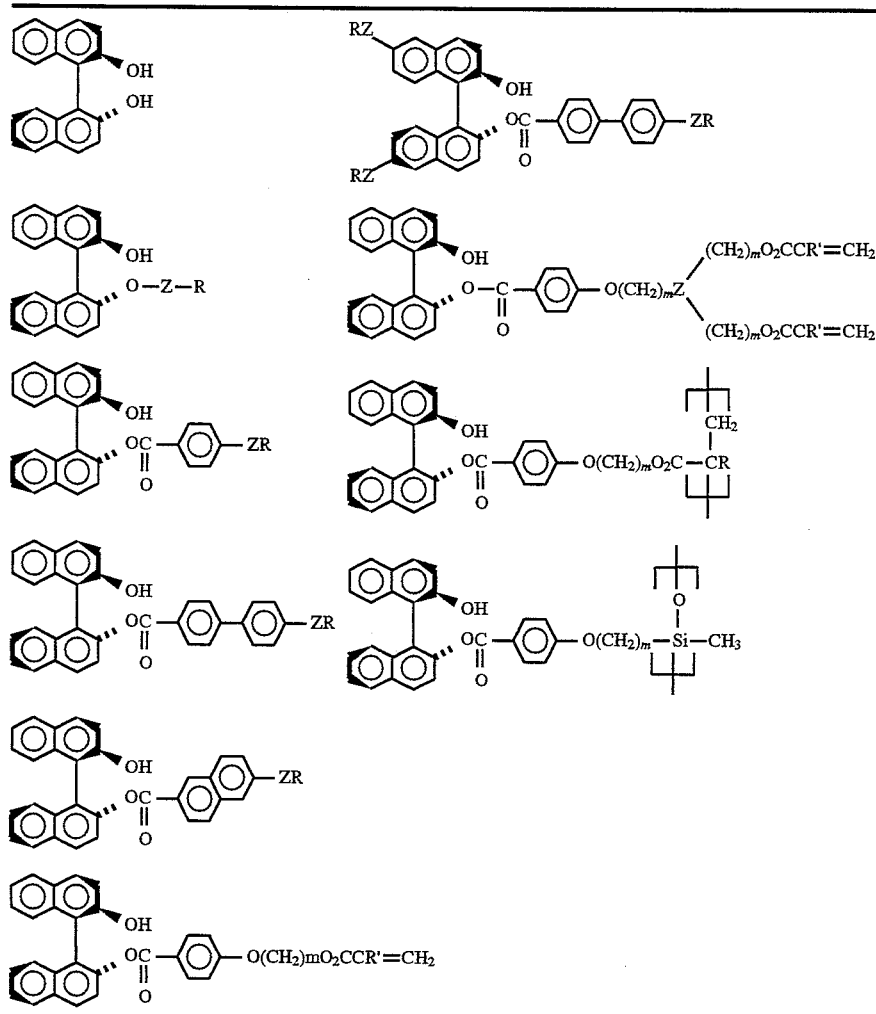

Compounds of the formula III may be prepared as shown in the following non-limiting examples, or by variants of these which would be apparent to those of ordinary skill in the art.

EXAMPLE 6

The compounds (R)-(+)-2-hydroxy-2-pentoxy-1,1'-binaphthalene and (R)-(+)-2,2'-dipentoxy-1,1'-binaphthalene were prepared as follows. 1 g (3.49 mmol) (R)-(+)-2,2'-dihydroxy-1,1'-binaphthalene and 0.99 g (5 mmol) iodopentane were dissolved in 40 ml acetone while stirring. 6.99 g of potassium carbonate and 7.99 g (57.9 mmol) potassium bromide was added in one portion. After 24 hours stirring at room temperature, 1 g potassium carbonate was added. The reaction mixture was heated to 45° C. for 30 minutes. The excess potassium carbonate and potassium bromide were filtered and the solvent of the filtrate was removed with a rotavap. The crude product was purified by flash column with silica gel and dichloromethane as the eluent to obtain 370 mg of product consisting of 25% of the monosubstituted product and 56% of the disubstituted product.

EXAMPLE 7

The compound(R)-(+)-2-hydroxy-2'-(4'-pentyloxy-4-biphenyl)-carboxy-1,1'-binaphthalene was prepared as follows. 0.8 g (2.7 mmol) of (R)-(+)-2,2'-dihydroxy-1,1'-binaphthalene and 0.95 g (3.3 mmol) 4'-pentoxy-4-biphenylcarboxylic acid were dissolved in 20 ml anhydrous $CH_2Cl_2$. The heterogeneous mixture was cooled to 0° C. in an ice bath. 0.69 g of dicyclohexyl carbodiimide was added at this temperature in one portion. After 24 hours stirring at room temperature the precipitated material was filtered and the solvent of the filtrate was removed with a rotavap at 30° C. The crude product was purified by flash column with silica gel and dichloromethane as the eluent to obtain the final product.

EXAMPLE 8

(R)-(+)-2-hydroxy-2'-(4-acryloyloxy)-butoxy-1,1'-binaphthalene was prepared as follows. 10.0 g (0.0357 mol) (R)-(+)-1,1'-bi-2-naphthol and 5.28 g (0.0357 mol) 4-hydroxybutyl acrylate were dissolved in 200 ml anhydrous THF with 9.35 g (0.0357 mol) triphenylphosphine at room temperature. The mixture was then cooled in an ice bath and a solution of 5.8 ml diethyl azodicarboxylate in 10 ml anhydrous THF was added dropwise. The reaction mixture was stirred at room temperature overnight. The solvent was removed with a rotavap at room temp. and the residue was purified with one flash chromatography in dichloromethane and one flash chromatography in dichloromethane/ ethylacetate (95:5). The monoacrylate final product was dried under phosphorous pentoxide with vacuum for 5 days.

In a variation of this embodiment, one or both of the naphthalene moieties in the formula III may be fused with an additional ring to obtain compounds having a higher helical twisting power. For example, the naphthalenes may be fused with an additional carbocyclic ring to form for example, biphenanthrols or bianthracols.

As alluded to above, the TCM compounds may include substituents or functional groups that are polymerizable with each other and/or with a photopolymerizable polymer added to the mixture. In this way, the TCMs, liquid crystals and other components of the system, as well as the pixels formed thereby, can be locked into place by forming a three-dimensional interconnected matrix or network of TCM or TCM and polymer. The formation of the network can be done either before or after the tuning of the chirality to form the pixels. In practice, the network formation should not significantly impair the ability of the TCMs to alter the pitch length of the materials or, if performed after pixelization, should not adversely effect the color of the pixels. To this end, it will in many instances be preferable to form the matrix or network prior to the tuning of the chirality so that the photopolymerization will not effect the color of the pixels once formed.

Preferred polymer additives are those that are soluble with the chiral nematic liquid crystal and which phase separate upon polymerization to form phase separated polymer domains. Suitable polymer materials may be selected from U.V. curable, thermoplastic and thermosetting polymers. Preferred materials include polymers formed from monomers having at least two polymerizable double bonds, polymethylmethacrylates, bisacrylates, vinyl ethers, hydroxy functionalized polymethacrylates, urethanes, and epoxy systems to name a few. Other suitable materials would be known to those of ordinary skill in the art in view of the present disclosure. The amount of polymer to be used depends upon the polymer, liquid crystal and TCM. It is contemplated that the polymer content may be high enough so that the liquid crystal phase forms as droplets interspersed within a polymer matrix. However, preferred materials according to the invention may be obtained with polymer contents ranging from about 0.1 to about 50% by weight based on the combined weight of polymer, liquid crystal and TCM. Preferably, the polymer content is kept below about 10–20% to minimize the effect of any difference between the index of refraction of the polymer and the indices of refraction of the liquid crystal, which gives rise to increasing "haze" when the material is viewed at increasing oblique angles. Ideally, polymerizable functional groups of the TCMs, if any, should be compatible, i.e., polymerizable, with any polymer in the system. A preferred expedient are acid moieties and/or acrylate moieties, although most any functional group having polymerizable double bonds will be suitable in connection with the preferred polymers. In this embodiment, the network formation and phototuning may proceed as conceptually shown below in Schemes 12 and 13, wherein the network is formed first, and then successive exposures to U.V. irradiation alter the chirality of the material. In practice, those regions intended to remain a specific color will be masked prior to each successive U.V. exposure.

Scheme 10

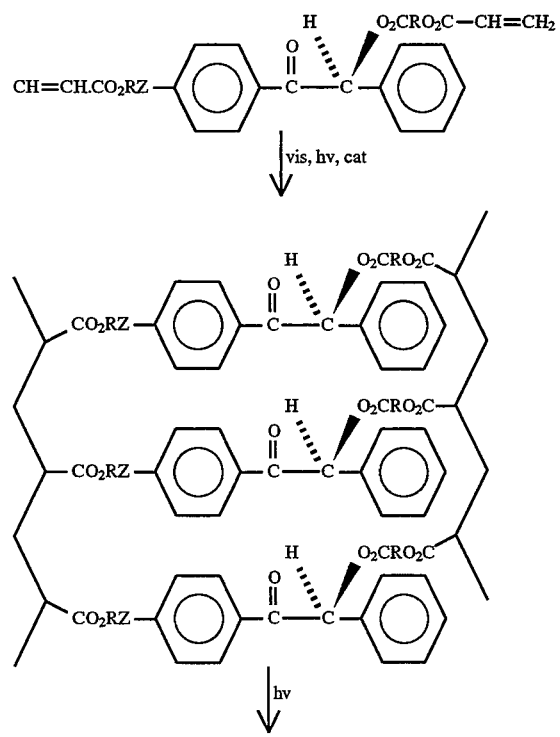

-continued
Scheme 10
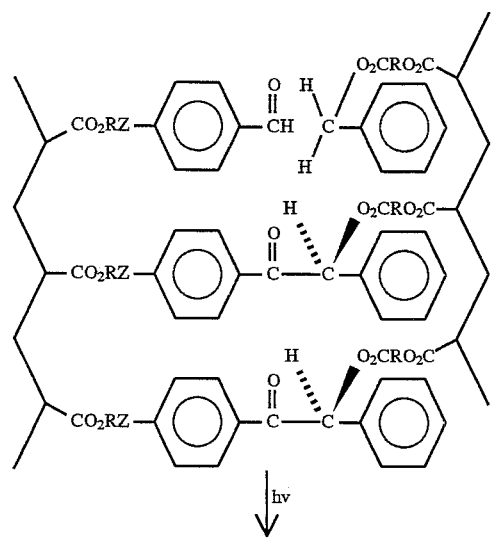
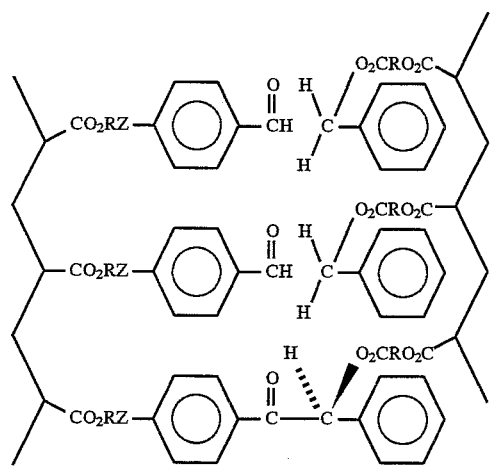
Scheme 11
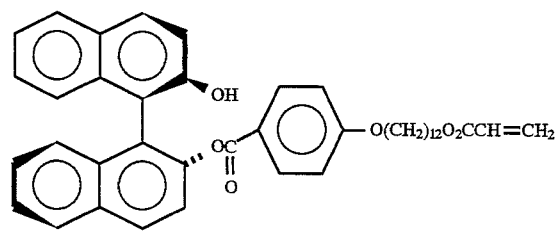

-continued
Scheme 10
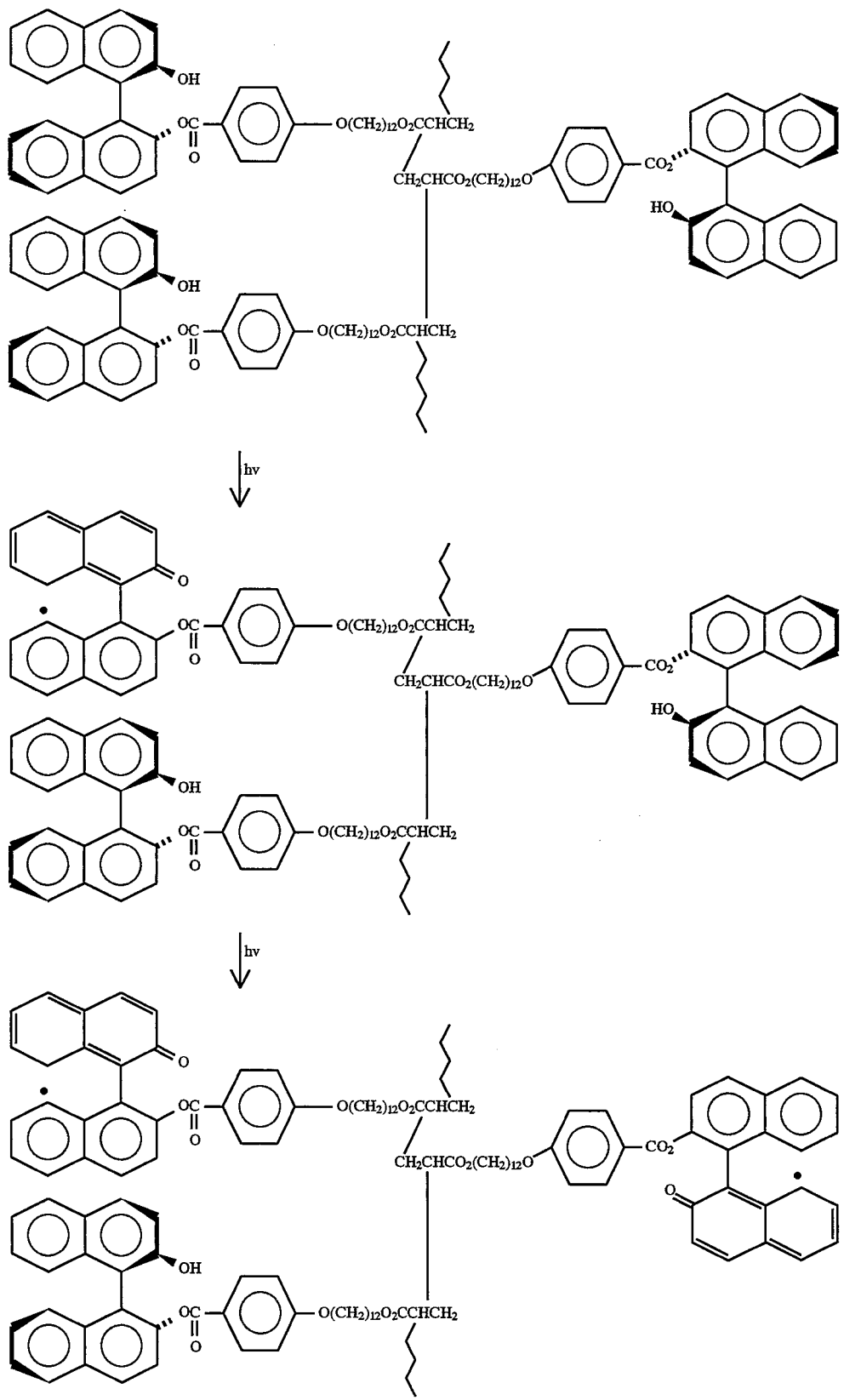

In a preferred manner of preparing a cell according to the invention the chiral nematic liquid crystal and TCM, together with any polymer (or its precursors, e.g. monomers), photo-initiator, cross-linking or curing agent and the like are mixed. Preferably, the mixture will form a homogeneous solution. The solution is then introduced between glass plates or similar substrates as is known in the art, such as by coating, vacuum filling and the like. The cell typically includes planar cell wall structure such as glass or plastic plates, which are sealed around their edges and separated by spacers. The plates are coated with transparent electrodes, such as indium-tin oxide (ITO) or the like, and include means to electrically address the liquid crystal material. The addressing means can be of any type known in the art, such as an active matrix, a multiplexing circuit, patterned electrodes and so on.

While not necessary to the invention, in some instances it may be desirable to treat the cell walls to provide for surface alignment of the liquid crystal molecules parallel or homeotropically to the cell walls, e.g., by providing the cell walls with rubbed polyimide layers or treating them with detergent or chemicals to promote homogeneous or homeotropic alignment of the liquid crystal. This can have the effect of altering the switching characteristics, or improving transmission and response time in some cells.

It is to be understood that the material can be addressed in various ways and incorporated in different types of cells. For example, instead of being addressed by externally activated electrodes, the new material can be addressed by an active matrix, a multiplexing scheme or other type of circuitry, all of which will be evident to those working in the art.

Once incorporated into the cell the solution is then polymerized in situ to induce concomitant phase separation of any polymer in the system to form the polymer domains. Alternatively, the pixels may be prepared prior to the formation of the polymer matrix. In either case, once the mixture is introduced into the cell, a high resolution mask is placed over the display. In its simplest embodiment, the mask may be a series of lines roughly 100 μm wide and space roughly 100 μm apart over the surface of the display. Once irradiated, the mask may be rotated 90° and irradiated again. This has the effect of creating three different colors in the display. When complete, it may be desirable to coat the display with a U.V. protective coating to prevent further color alteration.

The liquid crystal molecules and TCMs in the vicinity of the polymer domains are anchored or constrained by the polymer. In the case where the TCMs include photopolymerizable ligands such as acrylate moieties, they are polymerized or cross-linked directly with the polymer domains, as seen conceptually in Schemes 10 and 11, above, and may also be cross-linked with each other. As a result, the colored pixels formed according to the invention are locked into place. The polymerization of the polymer-liquid crystal solution can take place either in the presence of an electric field effective to homeotropically align the liquid crystal directors or in zero field. As a result, the liquid crystal material can be made to exhibit different optical states, i.e., light transmitting, light scattering, light reflecting and stable grey scale in between these states, under different field conditions. In the latter case of polymerization in the absence of a field, the liquid crystal molecules will prefer a twisted planar texture oriented parallel to the cell walls.

These and other features of the preferred invention will be clear from the following non-limiting examples.

EXAMPLE 9

A compound of formula I which was (R)-(+)-2-(4-pentyloxy)-phenyloxy-2-methyl-acetic acid was prepared. This compound employs the mechanism of photodecarboxylation upon exposure to U.V. irradiation. Approximately 6% by weight of this compound was mixed with 28% by weight of a right handed chiral mixture comprised of CB15/CE1/R1011 (available from E. Merck) in a ratio of 3:3:1, and 72% by weight E48 nematic liquid crystal, also available from E. Merck. The mixture reflected green color prior to the addition of the compound of formula I and blue green color after the addition, indicating that the PTC additive was also right handed. Half of the cell was masked with black electrical tape. The sample was exposed to U.V. light for a dose of 52 J/cm$^2$. Examination of the cell after UV irradiation showed the masked area to remain blue-green and the unmasked area to be green. This indicated that the chirality of the TCM material in the unmasked area had been destroyed. There was a sharp line between the masked and unmasked areas.

EXAMPLE 10

Three compositions were prepared using 3%, 5% and 10%, respectively, of a compound of formula II which was (R)-(+)-1-(4-methoxyphenyl)-2-hydroxy-2-phenylacetone, based on the weight of the liquid crystal. The liquid crystal composition was comprised of 28 wt % of chiral mixture of CB15/CE1/R1011 in a ratio of 3:3:1 and 72 wt % of E48 nematic liquid crystal. To this mixture was added 0.8% by weight based on the total weight of liquid crystal and TCM additive of the cross linking monomer bisacrylate biphenyl (BAB).

The mixtures were vacuum filled into cells comprised of indium tin oxide (ITO) electrode coated glass substrates separated by 5 micron spacers. The substrate surfaces were also coated with rubbed polyimide. The addition of the TCM resulted in a decrease of the pitch length of the liquid crystal composition so that the resultant colors were dark green, blue-green and blue for the 3%, 5% and 10% TCM cells, respectively.

The samples were irradiated with UV light and the UV dose varied across each cell to achieve color patterns. The region of the cell that received the longest exposure received a total dose of 55 J/cm$^2$ UV radiation, with each successive region progressively receiving approximately 18 J/cm$^2$ less exposure. The transmission spectrum versus UV dose and TCM concentration for each cell was measured using an HP 8452A photodiode array spectrometer.

Figure 2:
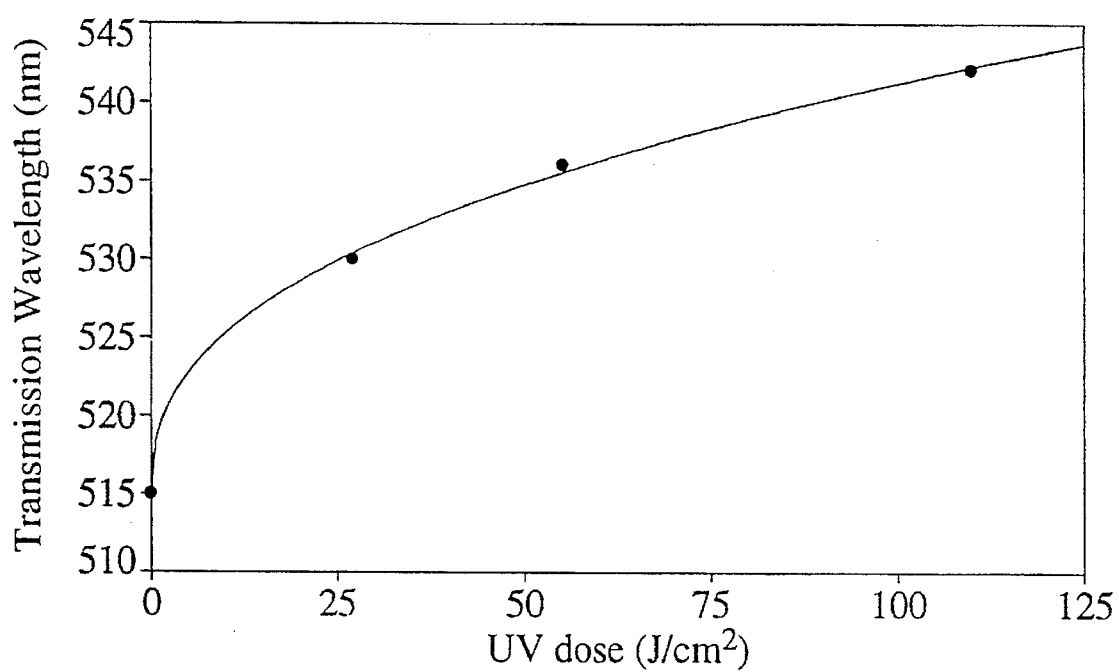
FIG. 2 is a plot of transmission wavelength versus UV dose for a composition according to the invention.

FIG. 1 shows the transmission wavelength versus the concentration of TCM additive in the three cells before and after UV irradiation. It can be seen that there is a greater increase in transmitted wavelength range in the 10% sample relative to the 3% sample. As mentioned previously, as photoirradiation occurs, the chirality of the TCM additive will be removed. This will decrease the total concentration of the chiral dopant. Consequently, there is an increase in the pitch of the chiral nematic material which results in a longer reflected wavelength. FIG. 2 shows the transmission wavelength versus UV dose for the 10% TCM material. In general, the concentration of the TCM of a given chirality decreases as the UV dose increases, which resulted in an increase in the pitch of this sample. Since the chirality of the TCM was destroyed with increasing doses, the pitch length was correspondingly increased with increasing doses and the wavelength reflected thereby lengthened as can be seen in the Figure.

EXAMPLE 11

Compounds of formula III, which were (R)-(+) and (S)-(−)-1,1'-binaphthol, a high helical twisting power additive, were obtained. To the chiral nematic liquid crystal composition of the preceding example was added 2.5% by weight of each binaphthol to two separate cells. The (S) binaphthol having the same handedness as the chiral nematic liquid crystal resulted in a cell reflecting blue colored light. The other cell filled with the (R) binaphthol having the opposite handedness of the chiral nematic liquid crystal resulted in a cell reflecting red colored light. These cells were then exposed to UV light for varying periods of time.

Figure 3:
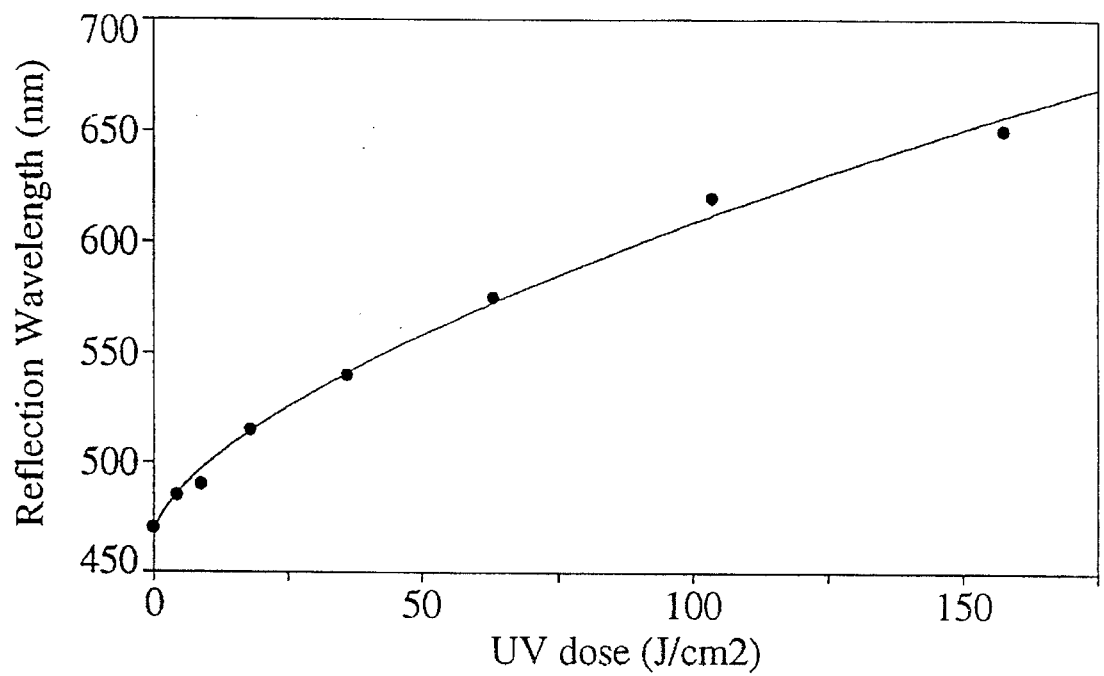
FIG. 3 is a plot showing the wavelength of maximum reflectivity versus UV dose of a composition according to the invention initially reflecting blue light.
Figure 4:
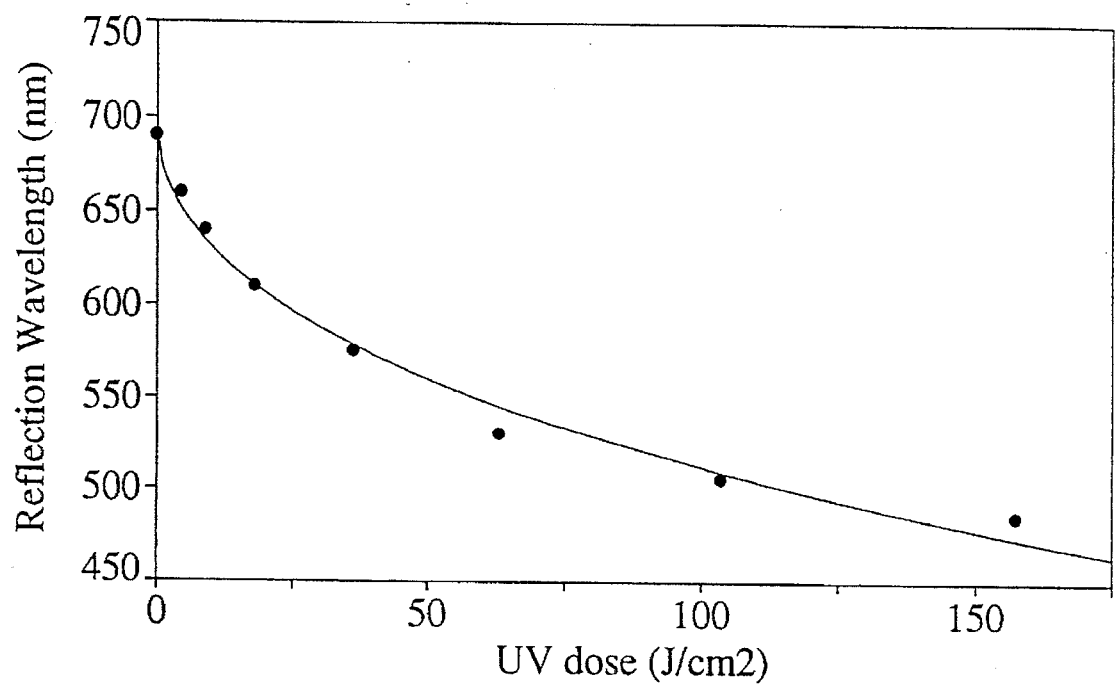
FIG. 4 is a plot showing wavelength of maximum reflectivity versus UV dose of another composition according to the invention initially reflecting red light.

Due to the high HTP of these compounds, less additive was necessary to tune the pitch across the color spectrum. FIGS. 3 and 4 show the wavelength of maximum reflectivity versus the UV dose for the two samples. In FIG. 3 the concentration of chiral material was adjusted so that the material reflected blue light prior to irradiation. As can be seen, the wavelength of maximum reflectivity, i.e., the wavelength reflected most intensely from the cell at the time of measurement, increases with increasing irradiation times. Similarly, in FIG. 4, the concentration of chiral material was adjusted so that the material initially reflected red light. As can be seen, the wavelength reflected by the cell was shortened with increasing irradiation times. Both samples demonstrate that the chirality of the 1,1'-binaphthol is removed during the extended period of irradiation. The reflected color of the samples was changed from one end of the visible spectrum to the other. Both cells required a long period of UV irradiation to change the pitch across the visible spectrum.

EXAMPLE 12

A high helical twisting power compound of the formula III, namely (S)-(−)-2-hydroxy-2'-(4'-pentyloxy-4-biphenyl)-carboxy-1,1'-binaphthol (HPBB) was prepared. 4.7% by weight of the HPBB was combined with a red reflecting mixture of 77% by weight E48 nematic liquid crystal and 23% by weight chiral material and introduced between substrates in the normal fashion. The back substrate was painted black. The resulting mixture reflected blue colored light by virtue of the HPBB having the opposite handedness of chirality as the red reflecting liquid crystal mixture. To illustrate the color tunability of this material, it was exposed to U.V. light having an intensity of 27.9 mW/cm$^2$ for varying periods of time to obtain a multicolored cell exhibiting colors across the entire visible spectrum as shown in Table 4 below. The U.V. dose is given in J/cm$^2$ and the time in seconds.

TABLE 4

| Color | blue | blue-green | green-blue | green-yello | yello-green | yello | yello-orang | orang | orang-red | orang-red | red |
|---|---|---|---|---|---|---|---|---|---|---|---|
| UV* (J/cm$^2$) | 0 | 11.16 | 16.74 | 22.32 | 61.38 | 66.96 | 83.70 | 100.4 | 117.2 | 133.9 | 167.4 |
| Time (s) | 0 | 400 | 600 | 800 | 2200 | 2400 | 3000 | 3600 | 4200 | 4800 | 6000 |

EXAMPLE 13

A composition was prepared as in the preceding example using 4.9% HPBB and 0.9% BAB polymerizable monomer. Again, the filled cell reflected blue colored light. As in the preceding example, the material was exposed to a 27.9 mW/cm$^2$ U.V. source for varying periods to obtain a cell reflecting light across the visible spectrum as shown in Table 5, below. It is noted that the first 100 second U.V. dose polymerized the polymerizable monomer.

TABLE 5

| Color | blue | blue | blue-green | green | green-yello | yello | yello-orang | orang | orang-red | red |
|---|---|---|---|---|---|---|---|---|---|---|
| UV* (J/cm$^2$) | 0 | 3.15 | 12.6 | 22.05 | 31.5 | 44.1 | 56.7 | 69.3 | 88.2 | 126 |
| Time (s) | 0 | 100 | 400 | 700 | 1000 | 1400 | 1800 | 2200 | 2800 | 4000 |

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A light modulating chiral nematic liquid crystal material including a chiral material adapted to change chirality upon application of an energy input, wherein said liquid crystal material includes a plurality of essentially distinct regions within which the liquid crystal has different pitch lengths, whereby said liquid crystal material can be made to reflect different wavelengths of light in different regions.

2. The material according to claim 1 including a plurality of essentially distinct region types, each of said region types having a pitch length effective to reflect a different color in the visible spectrum from the other of said region types.

3. The material according to claim 1 including three essentially distinct region types, each of said three region types having a pitch length effective to reflect a different color in the visible spectrum.

4. The material according to claim 1, 2 or 3, wherein said regions are distributed within said material in a pattern effective to produce images of any desired color or combination of colors.

5. The material according to claim 1 wherein said liquid crystal material is interspersed with a solidified polymer matrix.

6. In a light modulating chiral nematic liquid crystal composition, the improvement comprising a cleavable chiral material adapted to change its chirality upon photo-irradiation, said material being present in an amount effective to change the pitch length of the liquid crystal composition upon said photo-irradiation, and wherein said chiral material includes a chiral carbon whereby upon photo-irradiation the chiral carbon is rendered achiral by cleavage of a moiety from said chiral material.

7. The composition according to claim 6 wherein said chiral material includes a chiral carbon having a photo-cleavable leaving group directly bound thereto, whereby upon photo-irradiation the chiral carbon is rendered achiral.

8. The composition according to claim 6 wherein said chiral material includes a chiral carbon that is cleavable from said material upon photo-irradiation, whereupon the chiral carbon is rendered achiral.

9. The composition according to claim 6 wherein the chiral nematic liquid crystal and said chiral material have the same handedness of chirality.

10. The composition according to claim 6 wherein the chiral nematic liquid crystal and the chiral material have opposite handedness of chirality.

11. In a light modulating chiral nematic liquid crystal composition, the improvement comprising a chiral material adapted to change its chirality upon photo-irradiation, said material being present in an amount effective to change the pitch length of the liquid crystal composition upon said photo-irradiation, wherein said chiral material has as its dominant reaction product upon photo-irradiation a racemic mixture.

12. In a light modulating chiral nematic liquid crystal composition, the improvement comprising a chiral material adapted to change its chirality upon photo-irradiation, said material being present in an amount effective to change the pitch length of the liquid crystal composition upon said photo-irradiation, wherein said chiral material has as its dominant reaction product upon photo-irradiation a structural isomer with chirality opposite that of said chiral material.

13. The composition according to any one of claims 6, 7, 8, 11 or 12 further including a polymer matrix forming material.

14. In a light modulating chiral nematic liquid crystal composition, the improvement comprising a chiral material, having at least one polymerizable double bond, adapted to change its chirality upon photo-irradiation, said material being present in an amount effective to change the pitch length of the liquid crystal composition upon said photo-irradiation, including a polymer matrix forming material having at least one double bond that is polymerizable with at least one polymerizable double bond of said chiral material.

15. In a light modulating chiral nematic liquid crystal composition, the improvement comprising a chiral material adapted to change its chirality upon photo-irradiation, said material being present in an amount effective to change the pitch length of the liquid crystal composition upon said photo-irradiation, wherein said chiral material is selected from the group consisting of an arylcyano acetic acid, an aryloxy acetic acid, an aryl ketone, a binaphthol, a binaphthalene or combination thereof.

16. In a light modulating liquid crystal device comprising chiral nematic liquid crystal material adapted to form focal conic and twisted planar textures and cell wall structure confining said liquid crystal, the improvement wherein said liquid crystal material includes a chiral material adapted to change chirality upon application of an energy input, and a plurality of essentially distinct regions within which the liquid crystal has different pitch lengths, whereby said liquid crystal can be made to reflect different wavelengths of light in different regions.

17. The device according to claim 16 including a plurality of essentially distinct region types, each of said region types having a pitch length effective to reflect a different color in the visible spectrum from the other of said region types.

18. The device according to claim 17 comprising electrodes on said cell wall structure arranged in a manner adapted to simultaneously address the liquid crystal in at least two adjacent region types independently of the liquid crystal in other said region types, whereby the addressed regions appear white.

19. The device according to claim 16 including three essentially distinct region types, each of said three region types having a pitch length effective to reflect a different color in the visible spectrum.

20. The device according to claim 16, 17 or 19, wherein said regions are distributed within said material in a pattern effective to produce images of any desired color or combination of colors.

21. The device according to claim 16 wherein said liquid crystal material is interspersed with a solidified polymer matrix.

22. The device according to claim 16 wherein said cell wall structure is treated to align the liquid crystal.

23. The device according to claim 16 wherein said cell wall structure is treated to promote homeotropic alignment of said liquid crystal.

24. The device according to claim 16 comprising electrodes on said cell wall structure arranged in a manner adapted to electrically address said liquid crystal in each of said regions independently of the liquid crystal in each other of said regions.

25. A method of preparing a light modulating liquid crystal cell comprising the steps of:
   a) disposing between a pair of cell walls, a light modulating chiral nematic liquid crystal composition including a chiral material adapted to change its chirality upon irradiation, said material being present in an amount effective to change the pitch length of the liquid crystal composition upon said irradiation;
   b) masking at least a portion of said liquid crystal from an irradiation source; and,
   c) irradiating said liquid crystal composition to change the pitch length of the unmasked portion of said liquid crystal wherein said masking and photo-irradiation steps are preformed so as to create a plurality of essentially distinct regions within which the liquid crystal has different pitch lengths effective to reflect different colors in the visible spectrum.

26. The method according to claim 25 wherein said portion of said liquid crystal is masked by an electrically addressable liquid crystalline light shutter.

27. The method according to claim 25 further comprising disposing electrodes on said cell walls in a manner adapted to electrically address said liquid crystal in each of said regions independently of the liquid crystal in each other of said regions.

28. The method according to claim 25 further comprising disposing electrodes on said cell walls in a manner adapted to electrically address said liquid crystal in a plurality of said regions simultaneously, and independently of the liquid crystal in other said regions.

29. The method of claim 25 wherein said chiral material includes polymerizable double bonds, and said material is polymerized prior to said masking step.

30. The method of claim 25 further comprising disposing a polymerizable material between said cell walls and polymerizing said material to create a polymerized polymer network prior to said masking step.

* * * * *